(12) United States Patent (10) Patent No.: US 9,028,326 B2
Miyazaki et al. (45) Date of Patent: May 12, 2015

(54) OPERATING DEVICE

(71) Applicant: Sony Computer Entertainment Inc., Tokyo (JP)

(72) Inventors: Yoshio Miyazaki, Kanagawa (JP); Koji Hamada, Tokyo (JP); Yoshikazu Onuki, Kanagawa (JP); Kazuyoshi Enomoto, Tokyo (JP); Yutaka Sumi, Chiba (JP); Takamasa Araki, Tokyo (JP); Takamasa Ito, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/263,303

(22) Filed: Apr. 28, 2014

(65) Prior Publication Data

US 2014/0235349 A1 Aug. 21, 2014

Related U.S. Application Data

(63) Continuation of application No. 13/128,926, filed as application No. PCT/JP2009/067174 on Oct. 1, 2009, now Pat. No. 8,747,224.

(30) Foreign Application Priority Data

| Nov. 14, 2008 | (JP) | ................................. 2008-292839 |
| Nov. 14, 2008 | (JP) | ................................. 2008-292852 |
| Nov. 21, 2008 | (JP) | ................................. 2008-298810 |
| Nov. 21, 2008 | (JP) | ................................. 2008-298811 |

(51) Int. Cl.
  *A63F 13/24* (2014.01)
  *A63F 13/20* (2014.01)
  *G06F 3/0346* (2013.01)

(52) U.S. Cl.
  CPC .......... *A63F 13/06* (2013.01); *A63F 2300/1043* (2013.01); *A63F 2300/302* (2013.01); *G06F 3/0346* (2013.01)

(58) Field of Classification Search
  CPC .......... A63F 13/04; A63F 13/06; A63F 13/24; A63F 13/92; A63F 2300/10; A63F 2300/1043
  USPC ....................................... 463/36–39; 345/158
  See application file for complete search history.

(56) References Cited

U.S. PATENT DOCUMENTS 5,653,637 A * 8/1997 Tai ................................... 463/36
5,700,194 A * 12/1997 Hsien .............................. 463/37

(Continued)

FOREIGN PATENT DOCUMENTS

| JP | 06006875 | 1/1994 |
| JP | 7-116351 | 5/1995 |

(Continued)

OTHER PUBLICATIONS

Japanese Office Action dated May 21, 2013, from corresponding Japanese Application No. 2008-292839.

(Continued)

*Primary Examiner* — Omkar Deodhar
*Assistant Examiner* — Allen Chan
(74) *Attorney, Agent, or Firm* — Katten Muchin Rosenman LLP

(57) ABSTRACT

Provided is an operation device which allows various kinds of operation information to be input to a main body thereof as needed without unnecessarily increasing the weight of the operation device. The operation device includes: the main body having a shape elongated from one end to another end; a light emitting member provided to the one end of the main body; and a connection portion provided to the other end of the main body, to which an arbitrary one of a plurality of other operation devices is to be connected.

7 Claims, 17 Drawing Sheets

(56) References Cited

U.S. PATENT DOCUMENTS

| | | | |
|---|---|---|---|
| 5,796,387 | A | 8/1998 | Curran et al. |
| 7,153,212 | B1 * | 12/2006 | Karten et al. .................. 463/47 |
| 2002/0018049 | A1 * | 2/2002 | Love ............................ 345/161 |
| 2004/0229695 | A1 * | 11/2004 | Hussaini et al. ................ 463/38 |
| 2005/0026703 | A1 | 2/2005 | Fukawa |
| 2005/0170889 | A1 | 8/2005 | Lum et al. |
| 2006/0258456 | A1 | 11/2006 | Kawanobe et al. |
| 2006/0264260 | A1 | 11/2006 | Zalewski et al. |
| 2007/0105629 | A1 | 5/2007 | Toyama |
| 2007/0117625 | A1 | 5/2007 | Marks et al. |
| 2008/0132334 | A1 | 6/2008 | Nonaka et al. |
| 2008/0234023 | A1 | 9/2008 | Mullahkhel et al. |
| 2008/0261693 | A1 * | 10/2008 | Zalewski ........................ 463/31 |

FOREIGN PATENT DOCUMENTS

| | | |
|---|---|---|
| JP | 7-244557 | 9/1995 |
| JP | 9-230304 | 9/1997 |
| JP | 11003170 | 1/1999 |
| JP | 11-284577 | 10/1999 |
| JP | 2000-89335 | 3/2000 |
| JP | 2003143436 | 5/2003 |
| JP | 3112765 | 8/2005 |
| JP | 2007-83013 | 4/2007 |
| JP | 2007-83024 | 4/2007 |
| JP | 2007-527573 | 9/2007 |
| JP | 2007-300980 | 11/2007 |
| WO | 2005/073838 | 8/2005 |
| WO | 2007/032248 | 3/2007 |
| WO | 2008/120189 | 10/2008 |

OTHER PUBLICATIONS

Japanese Office Action dated May 28, 2013, from corresponding Japanese Application No. 2008-298810.
International Search Report dated Dec. 28, 2009 from corresponding International Application No. PCT/JP2009/067174.
International Preliminary Examination Report and Written Opinion of the International Searching Authority dated Jun. 30, 2011 from corresponding International Application No. PCT/JP2009/067174.
Supplementary European Search Report dated Jul. 31, 2012 from Corresponding European Application No. 09 82 5990.6.
Japanese Office Action dated Jun. 11, 2013 from corresponding Japanese Application No. 2008-292852.
Chinese Office Action dated Aug. 7, 2013 from corresponding Chinese Application No. 200980154439.7.
Japanese Notification of Reasons for Refusal dated Jan. 28, 2014, from corresponding Japanese Application No. 2008-292839.
U.S. Office Action dated Sep. 5, 2013 from corresponding U.S. Appl. No. 13/128,926.
U.S. Office Action dated Dec. 18, 2012 from corresponding U.S. Appl. No. 13/128,926.
U.S. Office Action dated Sep. 18, 2012 from corresponding U.S. Appl. No. 13/128,926.
U.S. Office Action dated May 24, 2012 from corresponding U.S. Appl. No. 13/128,926.

* cited by examiner

| COLOR NUMBER | LIGHTNESS VALUE | | |
|---|---|---|---|
| | LED240R | LED240G | LED240B |
| 0 | R0 | G0 | B0 |
| 1 | R1 | G1 | B1 |
| 2 | R2 | G2 | B2 |
| ⋮ | ⋮ | ⋮ | ⋮ |
| 15 | R15 | G15 | B15 |

| LOGICAL NUMBER | COLOR NUMBER |
|---|---|
| 1 | 1 (BLUE) |
| 2 | 2 (RED) |
| 3 | UNCONNECTED |
| 4 | UNCONNECTED |

OPERATING DEVICE

TECHNICAL FIELD

The present invention relates to an operation device, and more particularly, to an operation device including a light emitting member whose image is to be captured by a camera.

BACKGROUND ART

There is proposed a system (information processing system) in which, when an operation device having alight emitting member (light emitting portion) provided to a tip end of a stick-like main body is moved in front of a camera, the position of the light emitting member is recognized in a captured image by a game machine main body (information processing apparatus) connected to the camera, and, based on the position, execution of a program such as a game is controlled (see Patent Literature 1 below). According to such a system, by moving the position of the light emitting member of the operation device, it is possible to perform such control that moves the position of a cursor, the position of an object in a virtual game space, and the like, thereby enabling a remarkably intuitive user interface to be realized.

PRIOR ART DOCUMENT

Patent Document

Patent Document 1: US 2007/0117625 A1

DISCLOSURE OF THE INVENTION

Problems to be Solved by the Invention

However, according to the above-mentioned prior art, various kinds of information other than the position of the light emitting member cannot be input to the game machine main body by us ing the operation device. To address this, it is conceivable to integrally provide, to the operation device, a plurality of operation members, such as a microphone for inputting a voice of a player, and a stick-like member for inputting a direction. However, by doing so, the weight of the operation device increases due to such functions that are not necessarily used at all times. Consequently, the position of the light emitting member cannot be moved smoothly.

Further, in the above-mentioned prior art, it is conceivable to recognize a distance between the camera and the light emitting member based on the size of a region of the imaged light emitting member in the captured image. In this case, the size of the region of the imaged light emitting member in the captured image varies depending on the brightness of a background of the light emitting member in the captured image. Specifically, if the background is bright, the light emitting member is imaged smaller due to an influence from light in its surroundings. Conversely, if the background is dark, the light emitting member is imaged larger. For this reason, in the case where the distance between the camera and the light emitting member is recognized based on the size of the region of the imaged light emitting member in the captured image, there is a problem that a false recognition may occur.

Further, in the above-mentioned prior art, there is a case where a plurality of operation devices are communicably connected to the information processing apparatus. With this, a plurality of users can respectively perform operation input with respect to the information processing apparatus. However, in a case where such a configuration is adopted, the user may lose track of which operation device he/she was using after temporarily removing his/her hand from the operation device which the user was using. In order to avoid such a problem, it is conceivable that the operation devices are each provided with an indicator or the like which displays information for distinguishing from the other operation devices. A specific example of such information is, for example, a logical number (port number) assigned by the information processing apparatus. However, there is a fear that such an indication as the indicator may cause a false detection when detecting the position of the operation device based on the light from the light emitting member.

Further, for the above-mentioned prior art, there is a demand from the user of the operation device that the user be able to check as needed various kinds of device states, such as the charge state of a rechargeable battery built in the operation device. However, if an indicator or the like which displays such a device state is provided to the operation device, there is a fear that the indication of the indicator or the like may cause a false detection when detecting the position of the operation device based on the light from the light emitting member.

The present invention has been made in view of the above-mentioned problems, and an object thereof is to provide an operation device which allows various kinds of operation information to be input to a main body thereof as needed without unnecessarily increasing the weight of the operation device.

Further, another object of the present invention is to provide an operation device for which the size of a light emitting member is accurately imaged by a camera, regardless of the brightness of a background.

Further, still another object of the present invention is to provide an information processing system which enables a user to easily make a discrimination among a plurality of operation devices, and also to provide an operation device, an information processing apparatus, a control method therefor, and an information storage medium.

Further, still another object of the present invention is to provide an information processing system which enables a user to easily recognize a device state of an operation device, and also to provide an operation device, an information processing apparatus, a control method therefor, and an information storage medium.

Means for Solving the Problems

An operation device according to one aspect of the present invention includes: a main body having a shape elongated from one end to another end; a light emitting member provided to the one end of the main body; and a connection portion provided to the other end of the main body, to which an arbitrary one of a plurality of other operation devices is to be connected. The operation device may include a plurality of additional operation modules each provided with an input member for inputting information.

Further, one of the plurality of additional operation modules may include: a portion to be connected to the connection portion; and an additional connection portion, which is provided to an opposite side to the portion to be connected, and has the same shape as the connection portion of the main body so that another one of the plurality of additional operation modules is to be connected thereto in series.

In this case, each of the plurality of additional operation modules may include identification information storing means for storing identification information for identifying a type of the additional operation module. In addition, the main body may include identification information acquiring means for acquiring the identification information from the identification information storing means included in each of the plurality of additional operation modules connected directly or indirectly to the main body.

Further, the main body may include order discriminating means for discriminating an order of the additional operation modules connected to the main body in series. Each of the plurality of additional operation modules may include: a signal line to be connected in series when the plurality of additional operation modules are connected to the main body in series; and a voltmeter for measuring a voltage at a predetermined position on the signal line. In addition, the main body may include a power source for applying, from one end side thereof, a predetermined voltage to the signal lines connected in series. In this case, the order discriminating means may discriminate the order of the additional operation module connected to the main body in series, based on the voltage measured by each of the voltmeters.

Further, one of the plurality of additional operation modules may include, between a portion to be connected to the connection portion and the input member, a rotation mechanism for changing a direction of the input member with respect to the main body. Alternatively, one of the plurality of additional operation modules may be configured to connect to the main body or another one of the plurality of additional operation modules in a plurality of directions.

The operation device may further include determination means for determining the direction of the input member provided to the one of the plurality of additional operation modules. For example, the one of the plurality of additional operation modules may include a sensor for detecting a posture of the one of the plurality of additional operation modules, and the main body may include a sensor for detecting a posture of the main body. In this case, the determination means may determine the direction of the input member provided to the one of the plurality of additional operation modules with respect to the main body, based on a result of the detection by the sensor included in the main body and a result of the detection by the sensor included in the one of the plurality of additional operation modules.

Further, an operation device according to one aspect of the present invention includes: a light emitting element; an inner shell, which is formed in a hollow shape with a light diffusive material which diffuses light emitted from the light emitting element, and is provided at a position at which the inner shell receives the light emitted from the light emitting element; and an outer shell being colored and translucent, which covers an outer side of the inner shell. A surface of the outer shell may have a low reflection film formed thereon. In addition, the outer shell may be integrally formed with an engagement mechanism to the main body.

Further, an information processing system according to one aspect of the present invention includes: a plurality of operation devices each including a light emitting portion; and an information processing apparatus to be communicably connected to the plurality of operation devices, in which the information processing apparatus includes: detection means for detecting light emitted from the light emitting portion; and position identifying means for identifying a position of each of the plurality of operation devices based on a position of the detected light, and each of the plurality of operation devices causes the light emitting portion to emit the light with a different light emission color.

In the information processing system, the information processing apparatus may assign, to each of the plurality of operation devices communicably connected thereto, a logical number for identifying each of the plurality of operation devices, and each of the plurality of operation devices may cause the light emitting portion to emit the light with the light emission color determined based on the logical number assigned to the operation device.

Further, in the information processing system, the information processing apparatus may further include light emission control means for presenting candidates for the light emission color to a user of one of the plurality of operation devices, and transmitting, to the one of the plurality of operation devices, an instruction to cause the light emitting portion of the one of the plurality of operation devices held by the user to emit the light with a color selected by the user from among the candidates for the light emission color, and the one of the plurality of operation devices may cause the light emitting portion to emit the light with the color corresponding to the transmitted instruction.

In addition, the light emission control means may exclude a light emission color of another one of the plurality of operation devices from the candidates for the light emission color to be presented.

Further, an operation device according to one aspect of the present invention includes a light emitting portion and is to be communicably connected to an information processing apparatus, in which light emitted from the light emitting portion is used by the information processing apparatus so as to identify a position of the operation device, and the light emitting portion emits the light with a light emission color different from a light emission color of another operation device connected to the information processing apparatus.

Further, an information processing apparatus according to one aspect of the present invention is to be communicably connected to a plurality of operation devices each including a light emitting portion, and includes: detection means for detecting light emitted from the light emitting portion; position identifying means for identifying a position of each of the plurality of operation devices based on a position of the detected light; and light emission control means for causing the light emitting portion of each of the plurality of operation devices to emit the light with a different light emission color.

Further, a control method for an information processing apparatus according to one aspect of the present invention, which is to be communicably connected to a plurality of operation devices each including a light emitting portion, includes: detecting light emitted from the light emitting portion; identifying a position of each of the plurality of operation devices based on a position of the detected light; and causing the light emitting portion of each of the plurality of operation devices to emit the light with a different light emission color.

Further, a computer-readable information storage medium according to one aspect of the present invention has a program stored therein, the program causing an information processing apparatus, which is to be communicably connected to a plurality of operation devices each including a light emitting portion, and includes detection means for detecting light emitted from the light emitting portion, to function as: position identifying means for identifying a position of each of the plurality of operation devices based on a position of the detected light; and light emission control means for causing the light emitting portion of each of the plurality of operation devices to emit the light with a different light emission color.

Further, an information processing system according to one aspect of the present invention includes: an operation device including a light emitting portion; and an information processing apparatus, in which the information processing apparatus includes: detection means for detecting light emitted from the light emitting portion; and position identifying means for identifying a position of the operation device based on a position of the detected light, and the operation device changes a light emission mode of the light emitting portion in accordance with a device state of the operation device.

In the information processing system, the operation device may change the light emission mode of the light emitting portion in accordance with a charge state of a rechargeable battery built in the operation device.

Further, the operation device may change a light emission color of the light emitting portion when a remaining charge of the rechargeable battery has fallen below a predetermined threshold.

In addition, in the information processing system, the operation device may cause, in accordance with an instruction from a user, the light emitting portion to emit the light in a mode corresponding to the charge state of the rechargeable battery.

Further, an operation device according to one aspect of the present invention includes a light emitting portion, in which light emitted from the light emitting portion is used by an information processing apparatus so as to identify a position of the operation device, and a light emission mode of the light emitting portion is changed in accordance with a device state of the operation device.

Further, an information processing apparatus according to one aspect of the present invention is to be communicably connected to an operation device including a light emitting portion, and includes: detection means for detecting light emitted from the light emitting portion; position identifying means for identifying a position of the operation device based on a position of the detected light; means for acquiring a device state of the operation device; and light emission control means for changing a light emission mode of the light emitting portion in accordance with the acquired device state of the operation device.

Further, a control method for an information processing apparatus according to one aspect of the present invention, which is to be communicably connected to an operation device including a light emitting portion, includes: detecting light emitted from the light emitting portion; identifying a position of the operation device based on a position of the detected light; acquiring a device state of the operation device; and changing a light emission mode of the light emitting portion in accordance with the acquired device state of the operation device.

Further, a computer-readable information storage medium according to one aspect of the present invention has a program stored therein, the program causing an information processing apparatus, which is to be communicably connected to an operation device including a light emitting portion, and includes detection means for detecting light emitted from the light emitting portion, to function as: position identifying means for identifying a position of the operation device based on a position of the detected light; means for acquiring a device state of the operation device; and light emission control means for changing a light emission mode of the light emitting portion in accordance with the acquired device state of the operation device.

BEST MODE FOR CARRYING OUT THE INVENTION

Hereinbelow, embodiments of the present invention are described in detail with reference to the drawings.

First Embodiment

Figure 1:
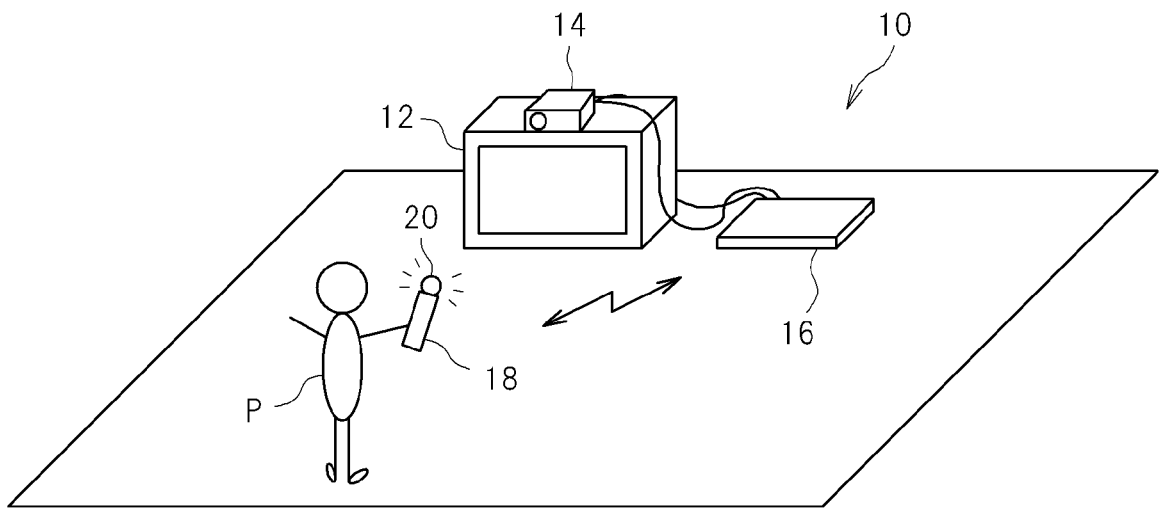
FIG. 1 A diagram illustrating a situation in which game operation information is input by using an operation device according to a first embodiment of the present invention.

FIG. 1 is a diagram illustrating a use situation of a game system according to a first embodiment of the present invention. As illustrated in the figure, a game system 10 includes a game machine main body 16 connected to a consumer television set 12, a camera 14 connected to the game machine main body 16, and an operation device 18 to be held by a player P with his/her hand. The game machine main body 16 is a publicly-known computer game system. The camera 14 is placed on, for example, a top surface of the television set 12 so as to capture an image of a front of the television set 12. A captured image obtained by the camera 14 is input to the game machine main body 16 and used therein for various kinds of information processing. A light emitting member 20 which emits particular color light is engaged to the tip of the operation device 18. When the player P holds and moves the operation device 18 in front of the camera 14, the game machine main body 16 recognizes the position of the light emitting member 20 in the captured image obtained by the camera 14, and also, based on the size of a region of the imaged light emitting member 20, recognizes a distance between the camera 14 and the light emitting member 20. Then, based on those pieces of information, processing for an application such as a game is controlled.

Figure 2:
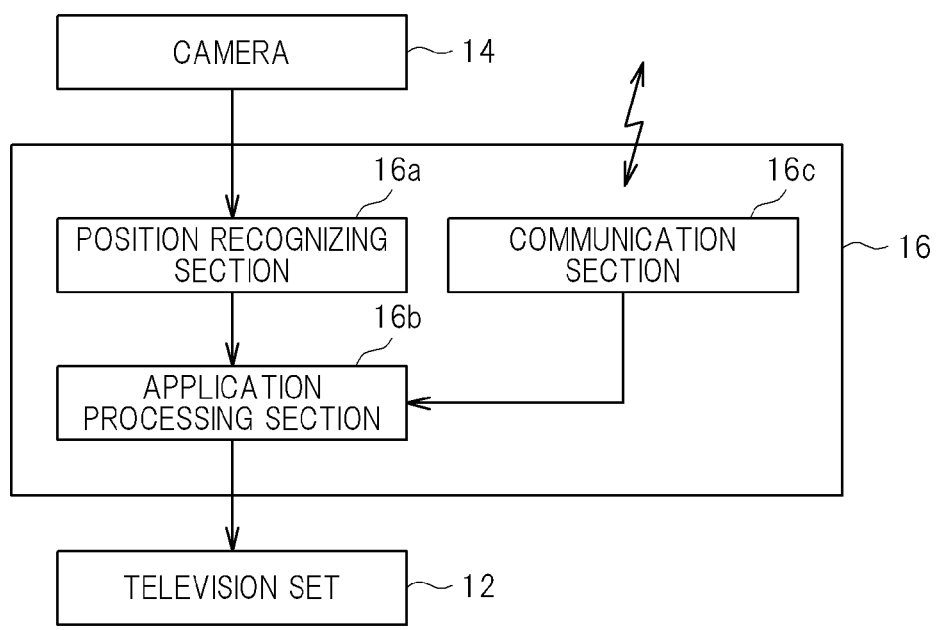
FIG. 2 A configuration diagram of a game system.
Figure 3:
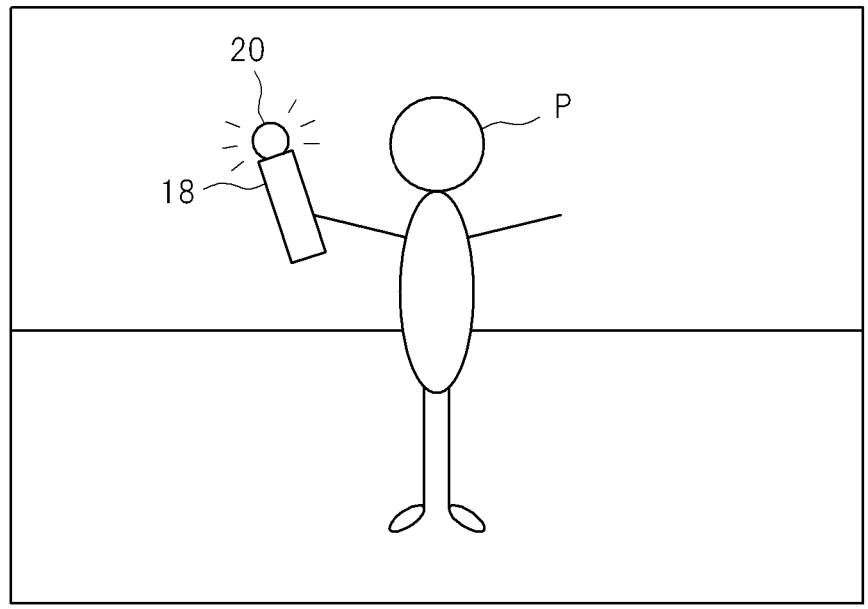
FIG. 3 A diagram illustrating a captured image obtained by a camera.
Figure 4:
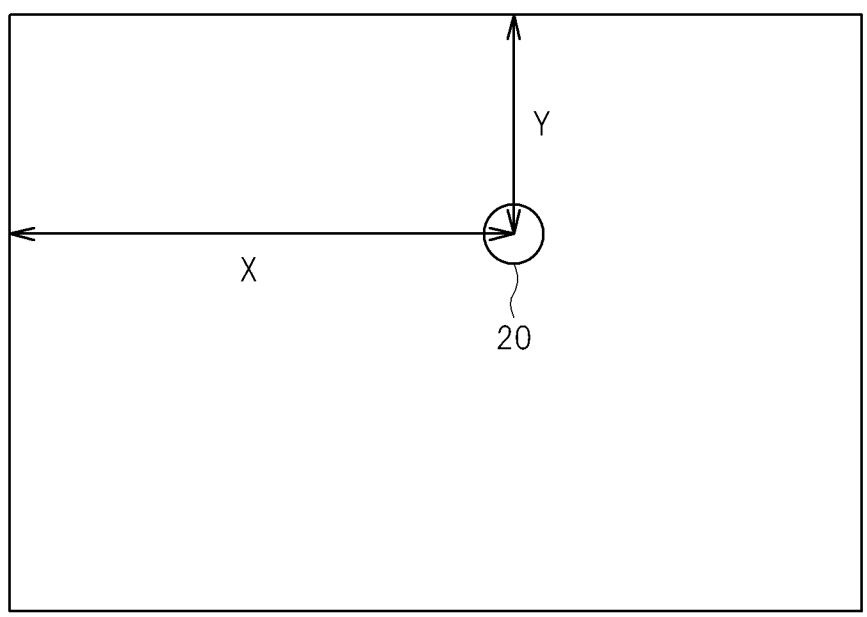
FIG. 4 A diagram illustrating position recognition processing.

Specifically, as illustrated in FIG. 2, the game machine main body 16 includes a position recognizing section 16a, an application processing section 16b, and a communication section 16c. The position recognizing section 16a and the application processing section 16b are implemented by executing a predetermined program in the game machine main body 16 being the computer game system. As illustrated in the figure, an image captured by the camera 14, for example, such an image as illustrated in FIG. 3, is supplied to the position recognizing section 16a. As illustrated in FIG. 4, the position recognizing section 16a extracts the region of the imaged light emitting member 20 from the supplied image, and acquires coordinates (X, Y) of a center position of the light emitting member 20 in the image. Further, the position recognizing section 16a calculates the area of the region of the imaged light emitting member 20, to thereby determine, based on the area, the distance between the camera 14 and the light emitting member 20. For example, if a relational expression between the area of the region and the distance to the light emitting member 20 is stored, the distance may be determined based on the relational expression.

The center position coordinates (X, Y) of the light emitting member 20 in the captured image and the distance between the camera 14 and the light emitting member 20 obtained in the above-mentioned manner are supplied to the application processing section 16b. The application processing section 16b uses those pieces of information so as to, for example, cause the position of a cursor displayed on a screen of the television set 12 to move, or cause the position of an object disposed in a virtual game space to move. Note that, the operation device 18 is also provided with conventional operation members such as buttons, and the contents of operations performed with respect to those members are transmitted to the game machine main body 16 with the use of wireless communication means. On the other hand, the game machine main body 16 is provided with the communication section 16c for performing wireless communication to the operation device 18, and the application processing section 16b controls various applications such as a game by also using the contents of operations received by the communication section 16c. The application processing section 16b generates a display image in accordance with the processing for the application, and the display image is then displayed by the television set 12.

Figure 5:
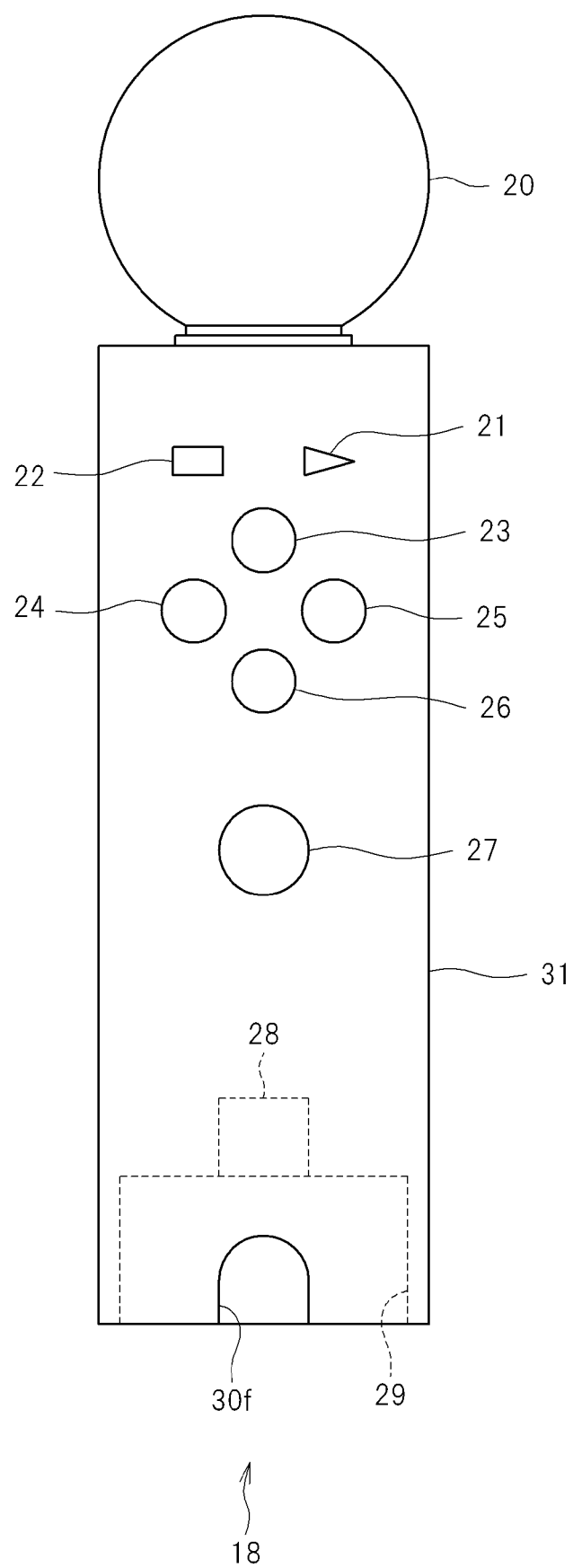
FIG. 5 A front view of the operation device.
Figure 6:
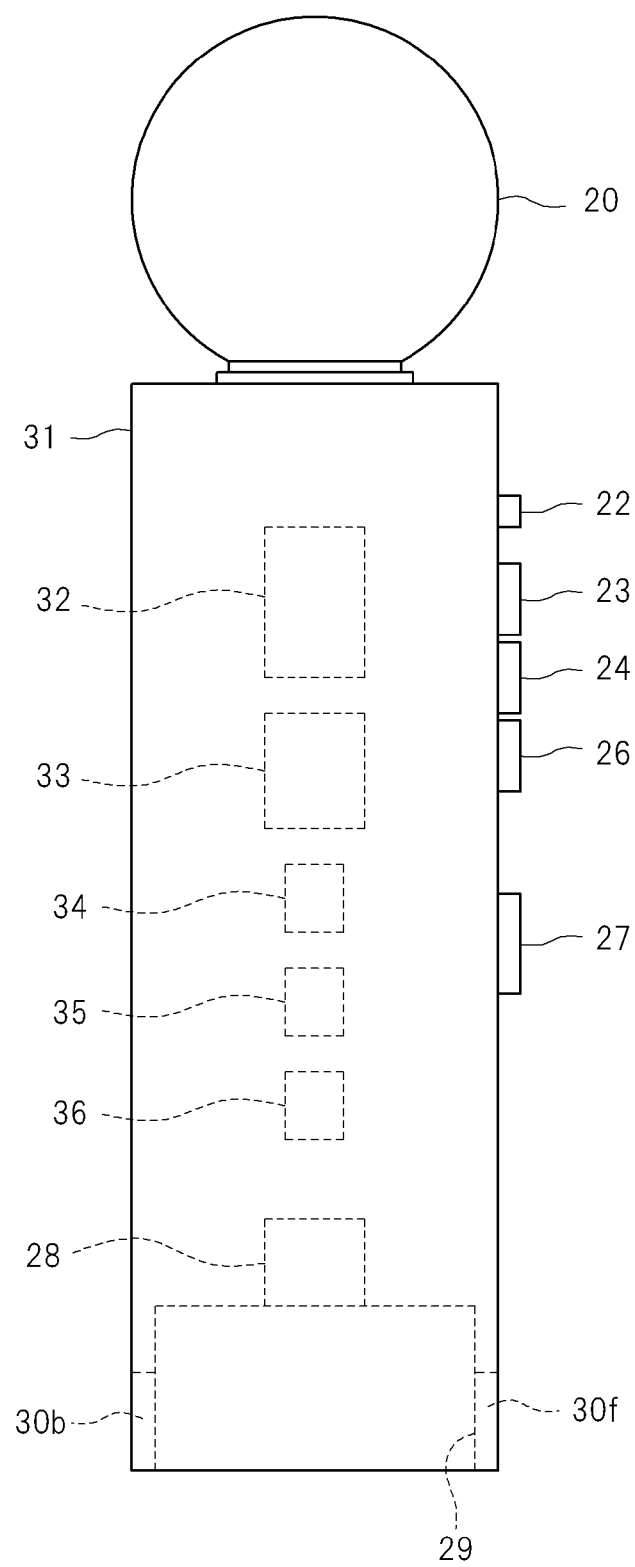
FIG. 6 A side view of the operation device.
Figure 7:
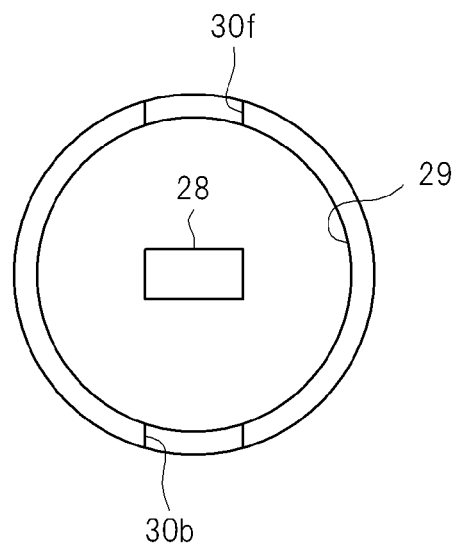
FIG. 7 A bottom view of the operation device.

Next, the operation device 18 is described in detail. FIG. 5, FIG. 6, and FIG. 7 are a front view, a side view, and a bottom view of the operation device 18. As illustrated in those figures, the operation device 18 includes a main body 31 in a substantially cylindrical shape which is elongated from one end toward the other end, and the one end side is provided with the light emitting member 20. The light emitting member 20 is constituted mainly by a light diffusive resin having a substantially spherical shell shape and a light emitting element for irradiating the resin with light. Further, the other end side of the main body 31 is provided with connection (coupling) structure including a connector 28 for performing data communication to another additional operation module. The connection structure includes, specifically, an accommodating recess portion 29 provided to the surface of the other end of the main body 31, and the female connector 28 provided to the center of the bottom of the accommodating recess portion 29. In order for a part of another additional operation module to be accommodated into the accommodating recess portion 29, the accommodating recess portion 29 is formed to have substantially the same shape as the part of the other additional operation module, and is provided with, on the periphery of its opening, fit-engagement portions 30f and 30b, which are notches to be fit-engaged with two fit-engagement pieces (portions to be fitted) provided to the other additional operation module. The fit-engagement portions 30f and 30b are provided on the front side and the back side of the main body 31. A surface of the main body 31 is provided with buttons 21 to 27. As described above, information indicating whether or not the buttons 21 to 27 are depressed is transmitted to the game machine main body 16 through the wireless communication means.

As illustrated in FIG. 6, the inside of the main body 31 is provided with a control unit 32, a vibration motor 33, an acceleration sensor 34, a gyroscope 35, a magnetic sensor 36, and the connector 28. The control unit 32 is constituted mainly by a publicly-known CPU and wireless data communication means, and detection contents from the acceleration sensor 34, the gyroscope 35, and the magnetic sensor 36 are input to the control unit 32. The acceleration sensor 34 is, for example, a three-axis acceleration sensor which detects respective accelerations (including gravitational acceleration) in an elongating direction (axial direction (first axis)), in a front direction (second axis), and in a lateral direction (third axis) of the main body 31, and outputs those values. The gyroscope 35 is a three-axis gyroscope which detects rotational speeds of the main body 31 about the above-mentioned first to third axes. The magnetic sensor 36 is means for detecting the orientation of the Earth's magnetic field. The control unit 32 transmits the detection contents from those sensors to the game machine main body 16, and the game machine main body 16 determines the movement, the posture, and the position of the operation device 18 based on the detection contents from those sensors. The control unit 32 supplies drive power to the vibration motor 33. The control unit 32 causes operation of the vibration motor 33 to start or stop, in accordance with a control signal transmitted by wireless from the game machine main body 16 or in an autonomous manner. The control unit 32 also supplies drive power to the light emitting member 20. Similarly, the control unit 32 causes light emission of the light emitting member 20 to start or stop, in accordance with a control signal transmitted by wireless from the game machine main body 16 or in an autonomous manner. Further, in a case where the light emitting member 20 is configured to be able to emit light having an arbitrary color as described below, the control unit 32 also performs control on the color of light emission performed by the light emitting member 20. The connector 28 is also connected to the control unit 32, and the content of an operation performed on the additional operation module is input via the connector 28. The content of such an operation is also transmitted by wireless to the game machine main body 16. In this case, the additional operation module stores identification information for identifying the type of the additional operation module, and the identification information is read by the control unit 32. Then, the identification information is also transmitted by wireless to the game machine main body 16. With the above-mentioned configuration, the game machine main body 16 can determine what type of the additional operation module is connected to the operation device 18, and what operation has been performed with respect to that additional operation module.

Figure 8:
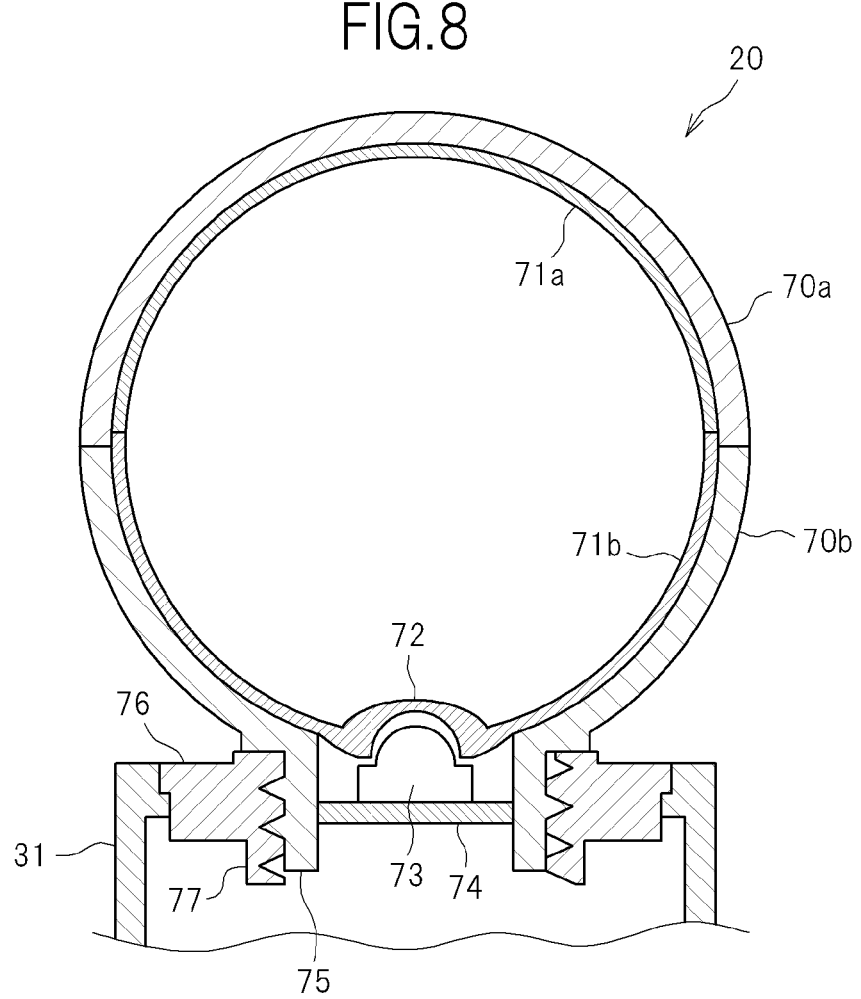
FIG. 8 A partial sectional view illustrating a light emitting member portion of the operation device.

Next, FIG. 8 is an enlarged longitudinal sectional view of the light emitting member 20. As illustrated in the figure, the light emitting member 20 includes a spherical shell shape portion having double-layer structure of an inner shell and an outer shell, and a light emitting element 73 provided adjacent to the spherical shell portion. The outer shell of the spherical shell shape portion is constituted by a tip end side outer shell portion 70a, which is positioned on the tip end side of the operation device 18 and is formed in a semispherical shell shape opening toward the base end side, and a base end side outer shell portion 70b, which is positioned on the base end side of the operation device 18 and is formed in a semispherical shell shape opening toward the tip end side. A circular hole is opened in a bottom portion of the base end side outer shell portion 70b, and, around the hole, there is provided an engagement mechanism 75, which is a cylindrically-shaped wall extending toward the main body 31. An outer circumferential surface of the engagement mechanism 75 has a thread groove formed therein. A top surface of the main body 31 has an opening formed therein, and the opening is covered with a support base 76. At the center of the support base 76, an opening is formed, and, around the opening, there is provided a receiving mechanism 77, which is a cylindrically-shaped wall extending toward the inside of the main body 31. An inner circumferential surface of the receiving mechanism 77 has a thread groove formed therein, and this thread groove and the thread groove formed in the outer circumferential surface of the engagement mechanism 75 are screwed together. In this manner, the light emitting member 20 is engaged on the top surface of the main body 31.

A circuit board 74 mounting the light emitting element 73 is mounted to the inside of the engagement mechanism 75. The light emitting element 73 is constituted by, for example, an LED. The irradiation of light is performed by the light emitting element 73 from the circular hole opened in the bottom portion of the base end side outer shell portion 70b toward the center of the spherical shell. Note that, the light emitting element 73 may include a plurality of LEDs for emitting light beams having different colors. In this case, the control unit 32 controls a light emission timing and the light emission color.

On the other hand, the inner shell is configured by a tip end side inner shell portion 71a, which is positioned on the tip end side of the operation device 18 and is formed in a semispherical shell shape opening toward the base end side, and a base end side inner shell portion 71b, which is positioned on the base end side of the operation device 18 and is formed in a semispherical shell shape opening toward the tip end side. The outside diameter of the inner shell and the inside diameter of the outer shell are substantially the same, and are in close contact with each other. The base end side inner shell portion 71b has a light receiving portion 72 formed, as a recess, in a bottom portion of the outer surface thereof. The light emitting element 73 directly faces the light receiving portion 72, and hence light emitted from the light emitting element 73 efficiently enters the inner shell.

The tip end side inner shell portion 71a and the base end side inner shell portion 71b constituting the inner shell are both formed of a resin material having a light diffusion function. An example of this resin material is such a material that is obtained by filling a transparent resin, such as polycarbonate, with numerous minute resin pieces similarly formed of a resin, such as polycarbonate, for reflecting light. On the other hand, the tip end side outer shell portion 70a and the base end side outer shell portion 70b constituting the outer shell are both formed of a translucent resin material having an achromatic color or a chromatic color. An example of this resin material is polycarbonate. In this description, as the resin material of the outer shell, a translucent material having a dark gray color is used. Further, the outer surface of the outer shell is subjected to mirror finishing, and is also coated with a low reflection film.

Light emitted from the light emitting element 73 enters the inner shell through the light receiving portion 72 and is then diffused inside the inner shell. Then, the light is radially emitted from the outer surface of the inner shell. After being slightly attenuated in the outer shell, the light is radially emitted to the outside. With this structure, the light emitting element 73 disposed on the top surface side of the main body 31 can cause the light to be emitted from the whole surface of the light emitting member 20 having a spherical shape. On this occasion, owing to the double-layer structure constituted by the inner shell and the outer shell, and to the fact that the respective shells are formed of the above-mentioned materials, when the light emitting member 20 is captured by the camera 14, a colored and translucent outer shell appears clearly in an edge portion of the region of the imaged light emitting member 20 in the captured image. Therefore, it is possible to accurately recognize the size of the region of the imaged light emitting member 20.

Figure 9:
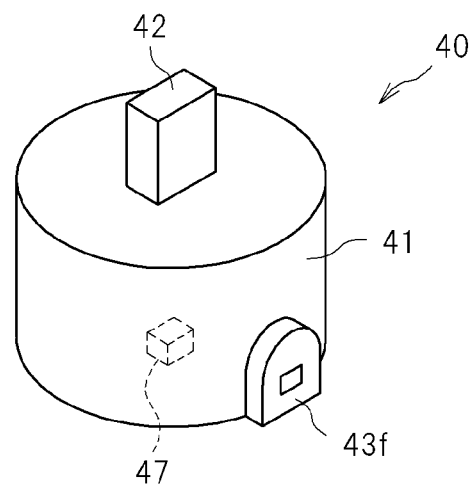
FIG. 9 A perspective view illustrating a first additional operation module viewed from a front direction.
Figure 10:
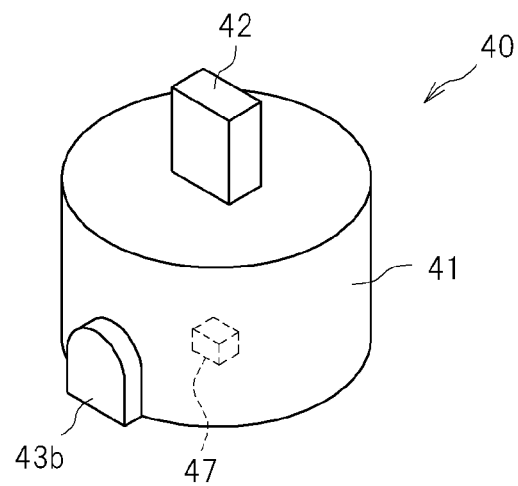
FIG. 10 A perspective view illustrating the first additional operation module viewed from a back direction.
Figure 11:
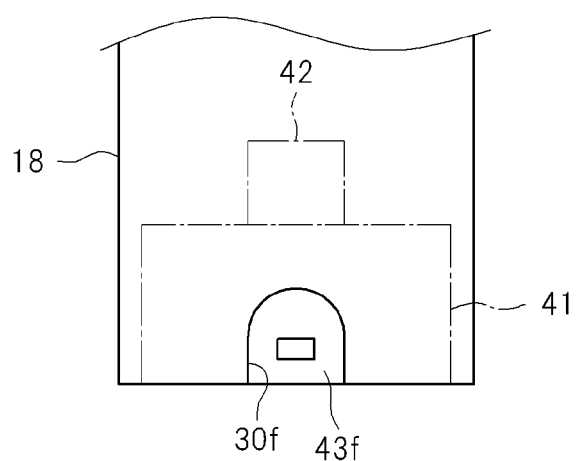
FIG. 11 A diagram illustrating a state in which the first additional operation module is mounted in a normal manner.
Figure 12:
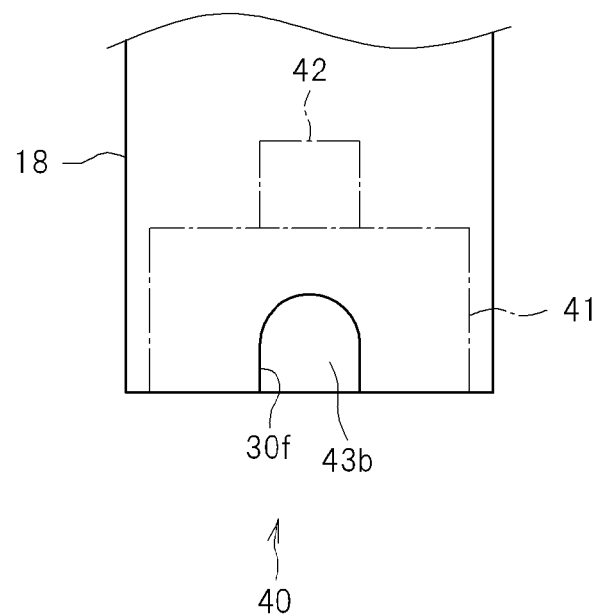
FIG. 12 A diagram illustrating a state in which the first additional operation module is mounted in a reversed manner.

Next, description is given of the additional operation module mounted to the base end side of the main body 31. FIG. 9 is a perspective view illustrating a first additional operation module viewed from the front direction. FIG. 10 is a perspective view illustrating the same device viewed from a back direction. FIG. 11 is a view illustrating a state in which the same device is mounted in a normal direction with respect to the main body 31, whereas FIG. 12 is a view illustrating a state in which the same device is mounted in a reversed direction. A first additional operation module 40 has a microphone built therein, and is used for the player P to input a voice. The first additional operation module 40 is provided with a portion 41 to be accommodated, which has a substantially cylindrical shape. A lower edge on the front side of the portion 41 to be accommodated is provided with a portion 43f to be fitted, which protrudes in a forward direction, and a lower edge on the back side thereof is provided with a portion 43b to be fitted, which protrudes in a backward direction. In the portion 43f to be fitted, there is formed a small hole for picking up thereinto the voice of the player P. The outside diameter of the portion 41 to be accommodated is almost the same as the inside diameter of the accommodating recess portion 29 of the main body 31, and the portion 41 to be accommodated is thus accommodated into the accommodating recess portion 29. On this occasion, the portions 43f and 43b to be fitted are fit-engaged with the fit-engagement portions 30f and 30b, respectively. A connector 42 is mounted on the top surface of the portion 41 to be accommodated, and the connector 42 is to be inserted into the connector 28 on the main body 31 side. The portions 43f and 43b to be fitted have the same outer shape, and the fit-engagement portions 30f and 30b have the same outer shape as well. In addition, the portions to be fitted and the fit-engagement portions have such shapes that correspond to each other. Further, the connectors 28 and 42 are capable of electrical connection even when connected in a back to front manner. Therefore, the first additional operation module 40 can be mounted to the main body 31 in both of the following states: a normal mounting state in which the portion 43f to be fitted is fit-engaged with the fit-engagement portion 30f provided on the front side of the main body 31 as illustrated in FIG. 11; and a reversed mounting state in which the portion 43b to be fitted is fit-engaged with the fit-engagement portion 30f provided on the front side of the main body 31 as illustrated in FIG. 12. The first additional operation module 40 has an acceleration sensor 47 built therein, and the detection content of the acceleration sensor 47 is transmitted to the control unit 32, and further to the game machine main body 16. The game machine main body 16 also receives the detection content of the acceleration sensor 34 of the main body 31, and thus, by comparing the detection contents, can determine whether the first additional operation module is in the normal mounting state or the reversed mounting state. With the above-mentioned structure, a wide variety of uses of the operation device 18 can be realized.

Figure 13:
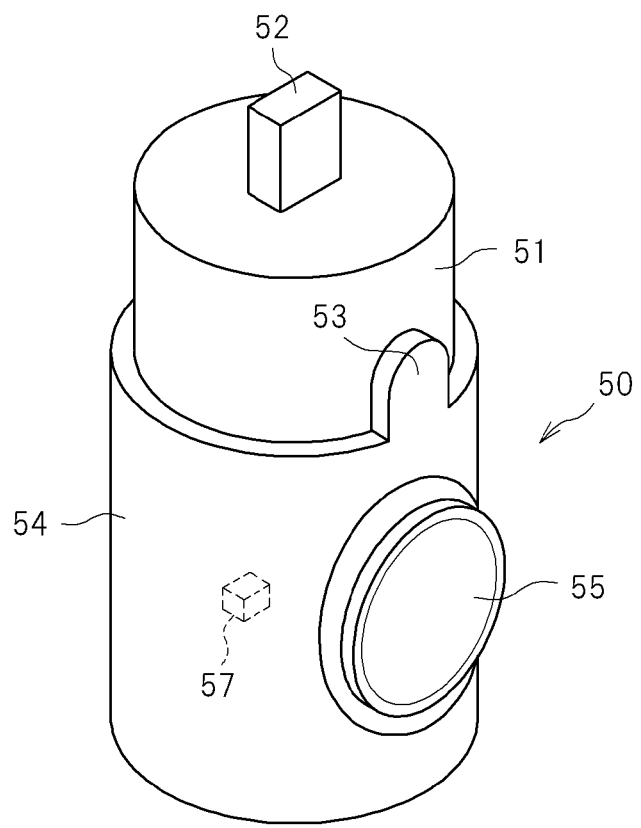
FIG. 13 A perspective view illustrating a second additional operation module viewed from the front direction.
Figure 14:
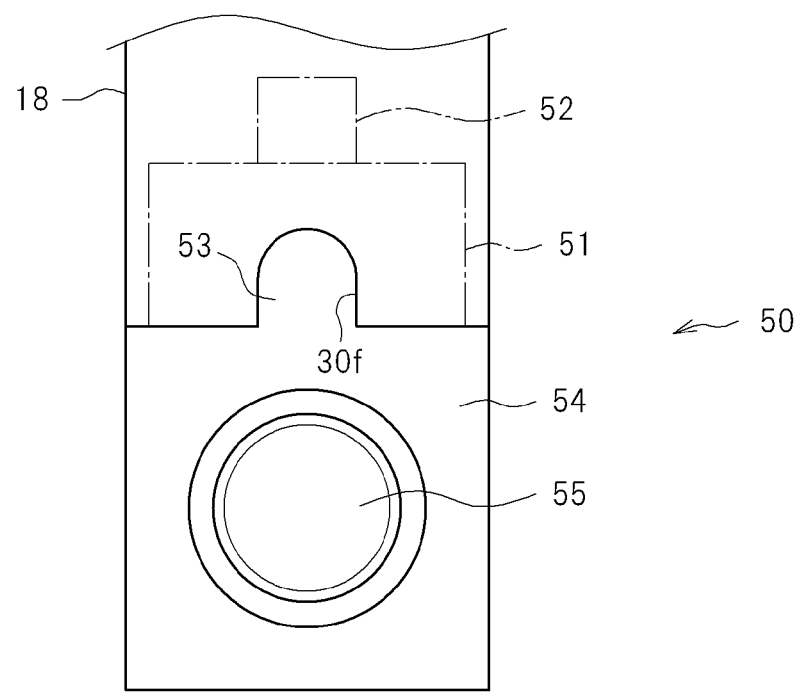
FIG. 14 A diagram illustrating a state in which the second additional operation module is mounted in a normal manner.

Next, FIG. 13 illustrates a second additional operation module, which is another type of the additional operation module. Further, FIG. 14 illustrates a state in which the second additional operation module is mounted to the main body 31 in the normal direction. The second additional operation module 50 includes a portion 51 to be accommodated in a cylindrical shape, which is to be accommodated into the accommodating recess portion 29, a connector 52 mounted onto the top surface thereof, and an extension portion 54, which coaxially extends from the lower surface of the portion 51 to be accommodated and has a cylindrical shape with a larger diameter than that of the portion 51 to be accommodated. The portion 51 to be accommodated is provided with portions 53 to be fitted, which are to be fit-engaged with the fit-engagement portions 30f and 30b. Further, an operation member 55 for inputting directions is mounted to the front of the extension portion 54.

As illustrated in FIG. 14, the second additional operation module 50, too, can be mounted to the base end portion of the main body 31 instead of the first additional operation module 40. Further, similarly to the first additional operation module 40, the second additional operation module 50 is capable of the normal direction mounting and the reversed direction mounting with respect to the main body 31. In this case, too, by comparing the detection content of the acceleration sensor 34 of the main body 31 with the detection content of an acceleration sensor 57 built in the second additional operation module 50, the game machine main body 16 can determine whether the second additional operation module 50 is in the normal mounting state or in the reversed mounting state. With such structure as described above in which an arbitrary one of a plurality of types of the additional operation modules can be mounted to the main body 31, it is possible to reduce the weight of the operation device 18 as compared to a case where operation members of such types that are not usually used are provided integrally to the main body 31 from the beginning. With this, the player P can operate the operation device 18 with little effort.

Figure 15:
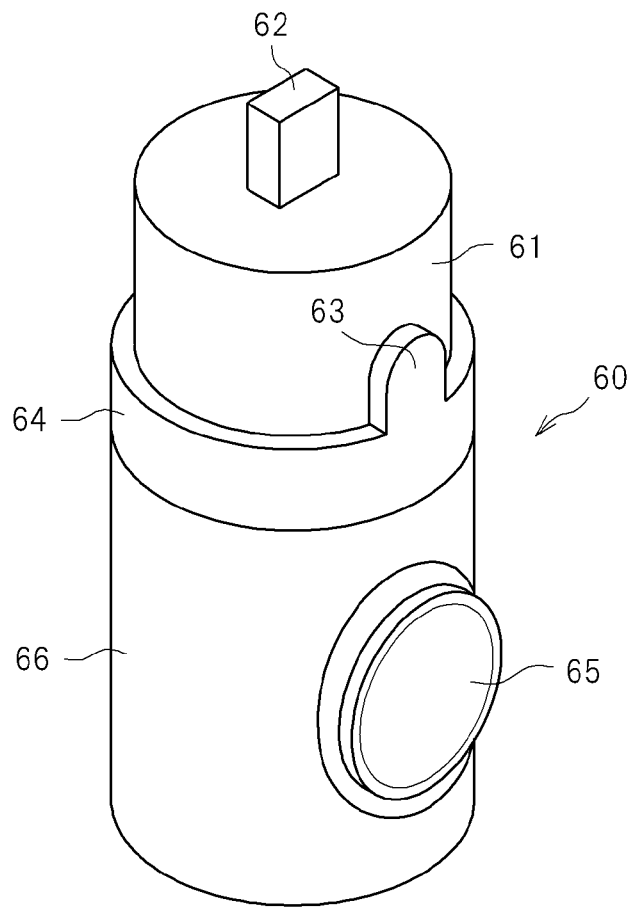
FIG. 15 A perspective view illustrating a third additional operation module viewed from the front direction.
Figure 16:
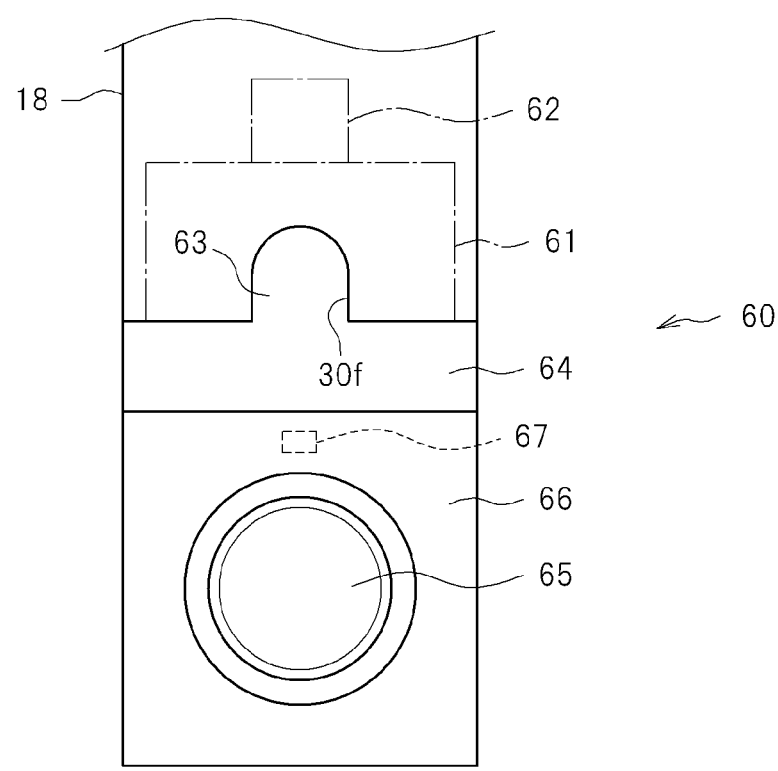
FIG. 16 A diagram illustrating a state in which the third additional operation module is mounted in a normal manner.

Note that, instead of providing the structure capable of the normal direction mounting and the reversed direction mounting with respect to the main body 31 like the first additional operation module 40 and the second additional operation module 50, a rotation mechanism may be provided so as to cause a portion of the additional operation module which is provided with the operation member to rotate. Specifically, like a third additional operation module 60 illustrated in FIG. 15 and FIG. 16, the following structure may be provided. That is, a portion 61 to be accommodated and an extension portion 64 having a larger diameter than that of the portion 61 to be accommodated are formed integrally. The portion 61 to be accommodated is provided with a connector 62 and portions 63 to be fitted. Meanwhile, an extension portion 66, which is another unit, is disposed on the lower surface side of the extension portion 64, and both the extension portions 64 and 66 are relatively rotatable about a rotation axis extending in the elongating direction of the main body 31. With this, it is also possible to rotate, with respect to the main body 31, the operation member 65 provided to the extension portion 66.

Second Embodiment

Figure 17:
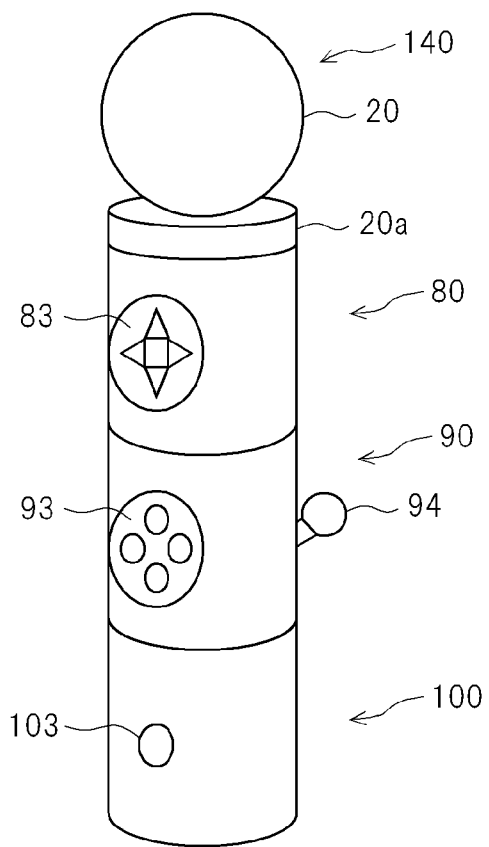
FIG. 17 An outer appearance perspective view of an operation device according to a second embodiment of the present invention.
Figure 18:
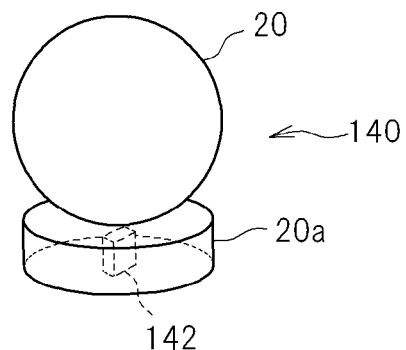
FIG. 18 A perspective view illustrating a light emitting module.
Figure 19:
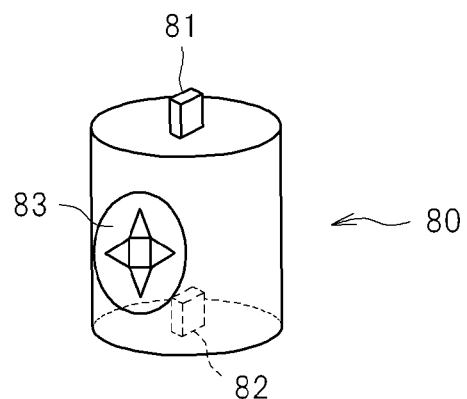
FIG. 19 A perspective view illustrating a main body module.
Figure 20:
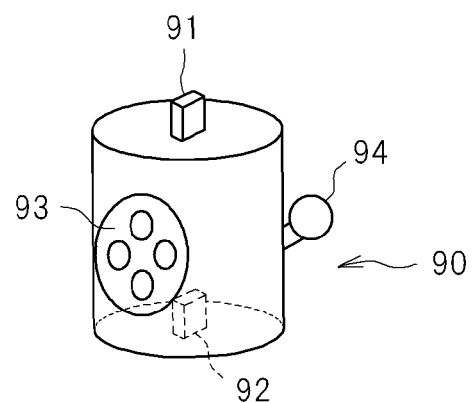
FIG. 20 A perspective view illustrating a first additional operation module.
Figure 21:
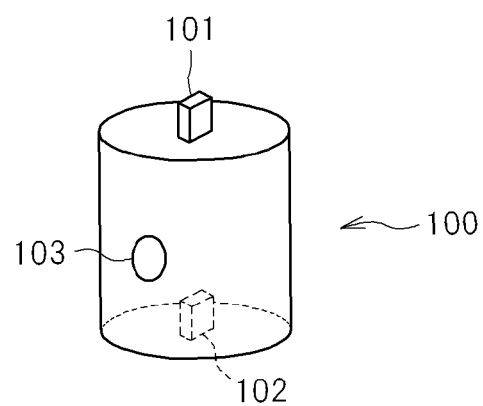
FIG. 21 A perspective view illustrating a second additional operation module.

Next, description is given of an operation device according to a second embodiment of the present invention. FIG. 17 is an outer appearance perspective view of the operation device according to the second embodiment, FIG. 18 is a perspective view illustrating a light emitting module viewed from the front direction, FIG. 19 is a perspective view illustrating a main body module viewed from the front direction, FIG. 20 is a perspective view illustrating a first additional operation module viewed from the front direction, and FIG. 21 is a perspective view illustrating a second additional operation module viewed from the front direction. The operation device illustrated in FIG. 17 has a light emitting module 140, a main body module 80, a first additional operation module 90, and a second additional operation module 100 connected in series in the stated order with the fronts of the respective modules facing the same direction. As illustrated in FIG. 18, in the light emitting module 140, the light emitting member 20 is engaged to the top surface of a main body 20a having a short cylindrical shape, and a connector (female connector) 142 is provided at the center of the lower surface of the main body 20a. As illustrated in FIG. 19, the main body of the main body module 80 has a cylindrical shape with the same diameter as that of the main body 20a of the light emitting module 140, and has an operation member 83 for inputting direction information disposed at the front thereof. Further, a connector (male connector) 81 is provided at the center of the top surface of the main body, and a connector (female connector) 82 is provided at the center of the lower surface thereof. As illustrated in FIG. 20, the main body of the first additional operation module 90 has a cylindrical shape with the same diameter as that of the main body of the main body module 80, and has an operation member 93 including a plurality of buttons disposed at the front thereof. Further, at the back thereof, there is disposed an operation member 94 having a stick-like shape, for transmitting, when tilted, a signal corresponding to the direction of the tilt to the game machine main body 16. Further, a connector (male connector) 91 is provided at the center of the top surface of the main body, and a connector (female connector) 92 is provided at the center of the lower surface thereof. Further, as illustrated in FIG. 21, the main body of the second additional operation module 100 has a cylindrical shape with the same diameter as that of the main body of the main body module 80, and has an operation member 103 including a single button disposed at the front thereof. Further, a connector (male connector) 101 is provided at the center of the top surface of the main body, and a connector (female connector) 102 is provided at the center of the lower surface thereof.

The example illustrated in FIG. 17 is realized by inserting the connector 81 of the main body module 80 into the connector 142 of the light emitting module 140 in such a manner that the fronts of both the modules face the same direction, inserting the connector 91 of the first additional operation module 90 into the connector 82 of the main body module 80 in such a manner that the fronts of both the modules face the same direction, and further inserting the connector 101 of the second additional operation module 100 into the connector 92 of the first additional operation module 90 in such a manner that the fronts of both the modules face the same direction.

Figure 22:
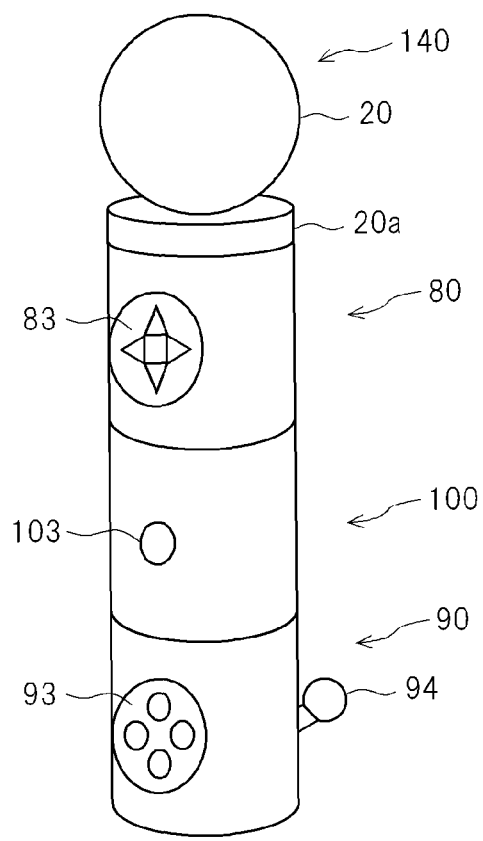
FIG. 22 A diagram illustrating a state in which the modules are connected in another mode.

In the operation device, the connectors 81, 91, and 101 have the same shape, and also, the connectors 82, 92, 102, and 142 have the same shape. Accordingly, the order of connection of the modules may be interchanged arbitrarily. For example, in the example illustrated in FIG. 22, the order of connection between the first additional operation module 90 and the second additional operation module 100 is interchanged.

Figure 23:
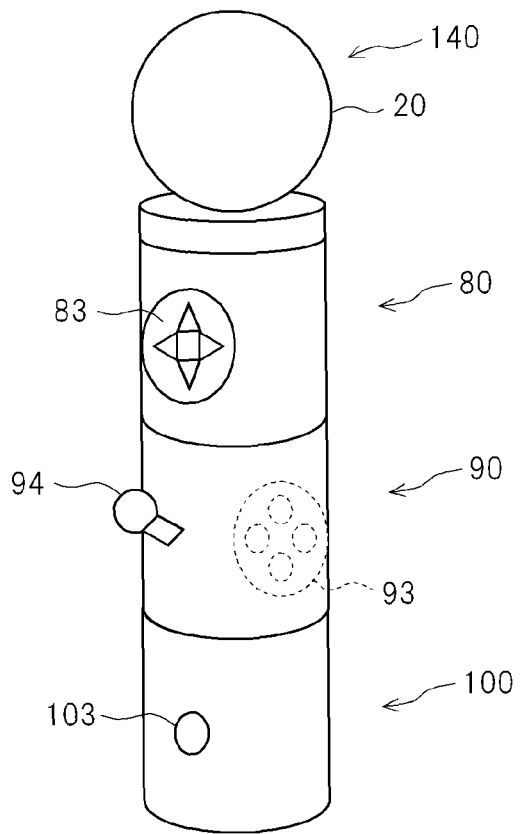
FIG. 23 A diagram illustrating a state in which the modules are connected in still another mode.

Further, the connectors 81, 82, 91, 92, 101, 102, and 142 are structured to be capable of electrical connection both in a mode in which the fronts of two modules to be coupled face the same direction and in a mode in which the front of one module and the back of the other module face the same direction. Thus, each module can be connected to another module in an arbitrary direction. For example, in the example illustrated in FIG. 23, the first additional operation module 90 is coupled to the main body module 80 such that the back of the first additional operation module 90 is positioned on the same side as the front of the main body module 80.

Figure 24:
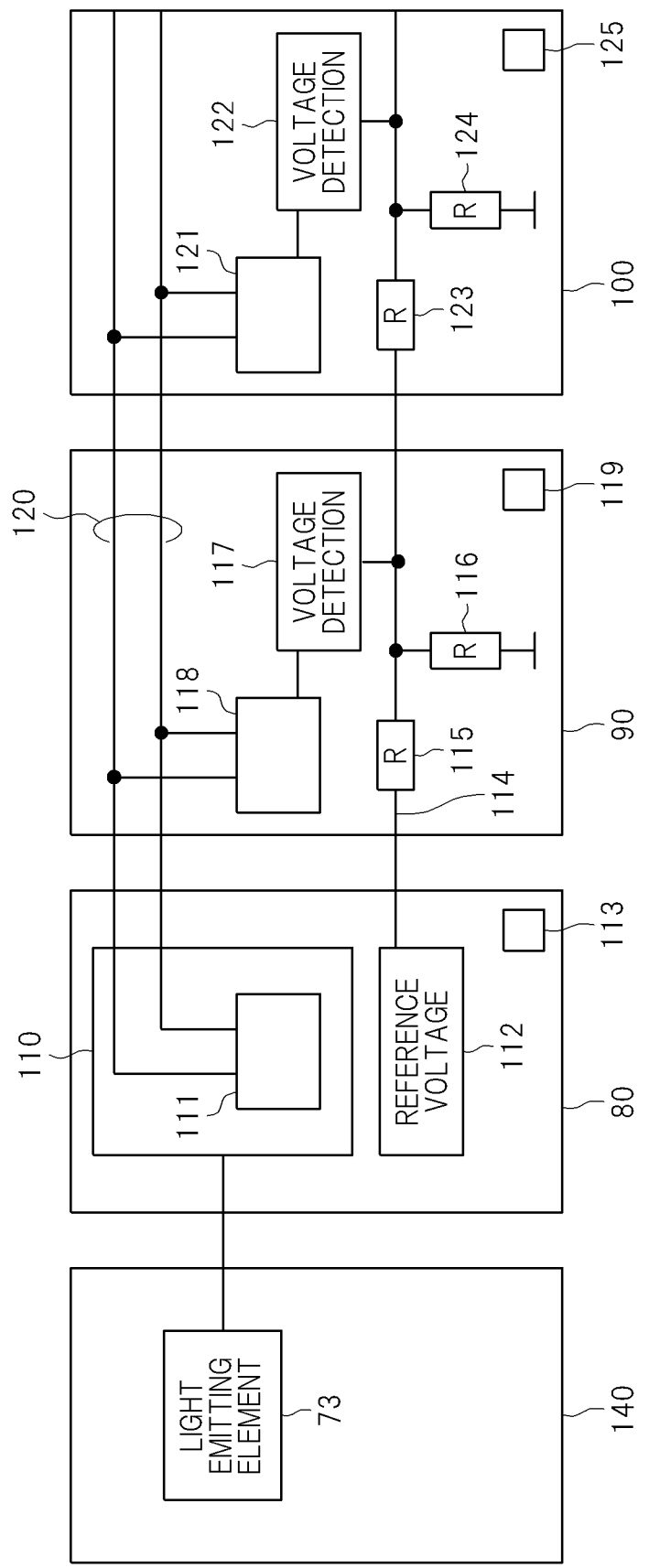
FIG. 24 A diagram illustrating a circuit configuration of the modules of the operation device.

FIG. 24 is a diagram illustrating a circuit configuration of the modules of the operation device. As illustrated in the figure, when the connectors are connected to each other, a serial bus 120 is formed by using, for example, the inter-integrated circuit (I2C) system. The main body module 80 is provided with a control unit 110 constituted mainly by a CPU and a wireless communication module, and a master communication section 111 for controlling data communication through the serial bus 120 is built in the control unit 110. The main body module 80 has an acceleration sensor 113 built therein, and the detection content of the acceleration sensor 113 is input to the control unit 110. Further, a reference voltage generation unit 112, which is a generation source of reference voltage, is provided, and the reference voltage generation unit 112 applies the reference voltage to another module coupled via the connector 82. The control unit 110 controls the light emission timing and the light emission color of the light emitting element 73 in an autonomous manner or in accordance with a control signal transmitted from the game machine main body 16 via the wireless communication module.

In the first additional operation module 90, signal lines extending from the connector 91 to the connector 92 are provided as a partial section of the serial bus 120. A slave communication section 118 is connected to this section, and data indicating the contents of operations performed on the operation members 93 and 94 is transmitted by the slave communication section 118 to the master communication section 111. Further, identification information indicating the type of the first additional operation module 90 which is stored in a memory (not shown) is also transmitted to the master communication section 111. Further, the first additional operation module 90, too, has an acceleration sensor 119 built therein, and the detection content thereof is transmitted by the slave communication section 118 to the master communication section 111. In the first additional operation module 90, there is further provided a voltage signal line 114 extending from the connector 91 to the connector 92. A resistor 115 is interposed in the middle of the voltage signal line 114, and one end of a resistor 116, which has the other end grounded, is connected at a position closer to the connector 92 side than the resistor 115. Then, the voltage of the one end of the resistor 116 is detected by a voltmeter 117, and the content thereof is also transmitted by the slave communication section 118 to the master communication section 111.

The second additional operation module 100 also has the same configuration as the first additional operation module 90, and signal lines extending from the connector 101 to the connector 102 are provided as a partial section of the serial bus 120. A slave communication section 121 is connected to this section, and data indicating the content of an operation performed on the operation member 103 is transmitted by the slave communication section 121 to the master communication section 111. Further, the identification information indicating the type of the second additional operation module 100 which is stored in a memory (not shown) is also transmitted to the master communication section 111. Further, the second additional operation module 100, too, has an acceleration sensor 125 built therein, and the detection content thereof is transmitted by the slave communication section 121 to the master communication section 111. In the second additional operation module 100, there is further provided a voltage signal line extending from the connector 101 to the connector 102. A resistor 123 is interposed in the middle of the voltage signal line, and one end of a resistor 124, which has the other end grounded, is connected at a position closer to the connector 102 side than the resistor 123. Then, the voltage of the one end of the resistor 124 is detected by a voltmeter 122, and the content of the detection is also transmitted by the slave communication section 121 to the master communication section 111.

The pieces of information collected in the control unit 110 in the above-mentioned manner are transmitted by the wireless communication module to the game machine main body 16. The game machine main body 16 determines the order of coupling of the modules by comparing the voltage values transmitted from the respective modules. Specifically, the game machine main body 16 determines the order of coupling of the modules by taking into account a fact that the detected voltage value gradually decreases in accordance with the order from the main body module 80. Further, by comparing the detection contents of the acceleration sensors 113, 119, and 125 transmitted from the respective modules, the game machine main body 16 determines the directions of coupling of the respective modules. Then, in accordance with the content of the determination, the content of the processing for the application is changed. Note that, the first and second additional operation modules 90 and 100 may each hold a table storing the order of connection and the range of voltage, to thereby determine the orders of connection of their own by checking the voltage values detected by the voltmeters 117 and 122 in the table. In this case, it is only necessary that the determined order of connection be notified to the control unit 110.

As described above, by constituting the operation device by a plurality of modules, providing the operation member to the side surface of each module, and making the coupling mode between the modules arbitrarily changeable, the operation device can be changed arbitrarily in accordance with the type of the application executed on the game machine main body 16 or in accordance with the preference of the player P. Further, in the game machine main body 16, the content of the processing for the application can be changed in accordance with the coupling mode.

Third Embodiment

Next, description is given of a third embodiment of the present invention.

Figure 25:
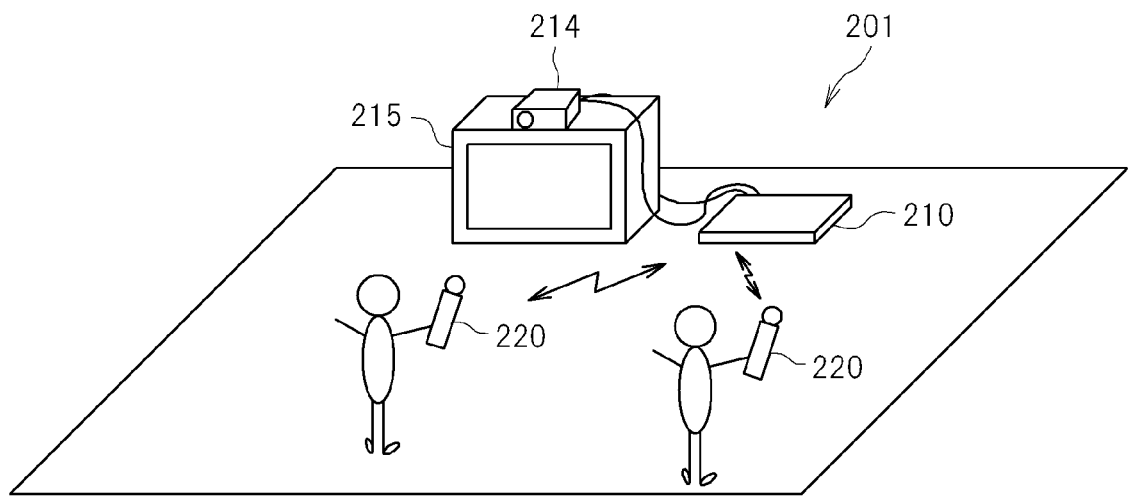
FIG. 25 A schematic diagram of an information processing system according to a third embodiment of the present invention.

FIG. 25 is a schematic diagram of an information processing system 201 according to the third embodiment. As illustrated in the figure, the information processing system 201 includes an information processing apparatus 210 and a plurality of operation devices 220 each provided with the light emitting portion. The information processing apparatus 210 includes an image capture unit 214, and is connected to a display apparatus 215. Further, each of the operation devices 220 is communicable with the information processing apparatus 210 via a wireless communication interface. Users of the information processing system 201 each hold the operation device 220, and operate a button or the like provided to the operation device 220 with their hands. In response, the content of the operation performed by the user is transmitted to the information processing apparatus 210 via the wireless communication interface. Further, the information processing apparatus 210 uses the image capture unit 214 to capture the image of light emitted from the light emitting portion of each of the operation devices 220, and identifies the position of each of the operation devices 220 in a real space based on the captured image. With this, each user can perform operation input with respect to the information processing apparatus 210 not only by operating a button or the like provided to the operation device 220 but also by moving the operation device 220 itself.

Hereinbelow, description is given of hardware configurations of the information processing apparatus 210 and the operation device 220 according to this embodiment.

Figure 26:
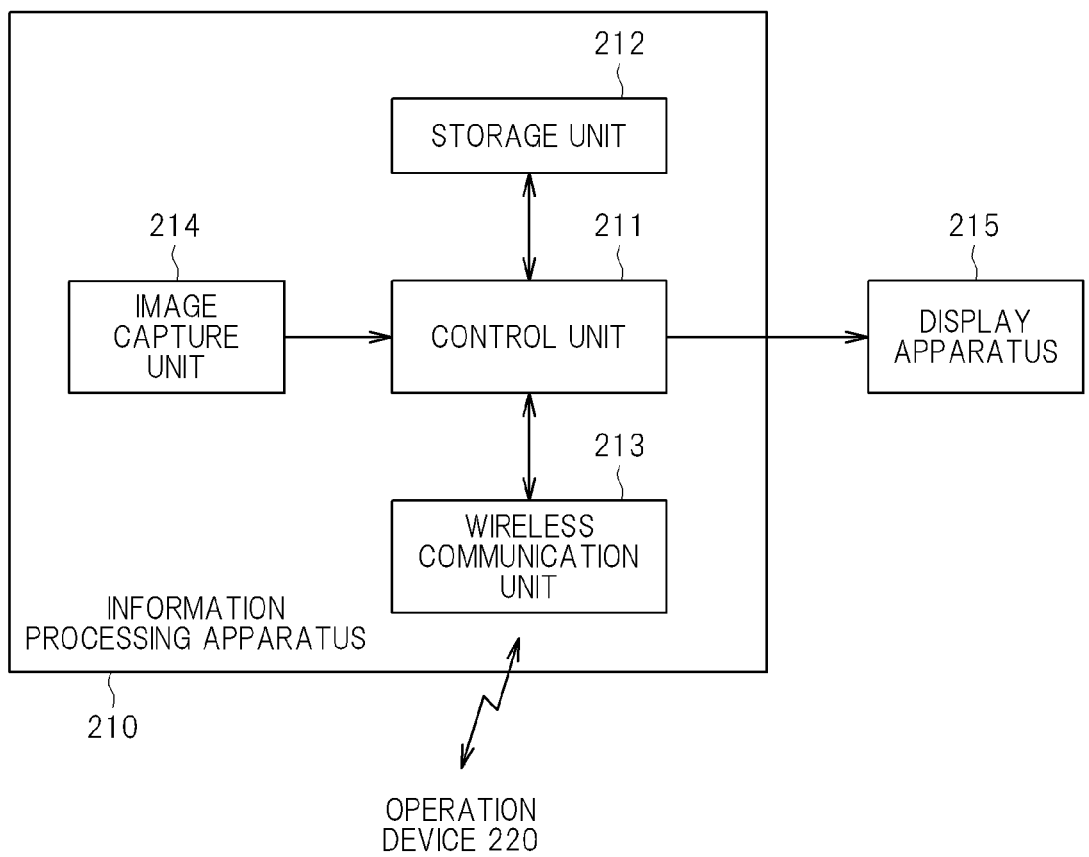
FIG. 26 A configuration block diagram illustrating a configuration example of an information processing apparatus according to the third embodiment of the present invention.

The information processing apparatus 210 is, for example, a consumer game machine or a personal computer, and, as illustrated in FIG. 26, includes a control unit 211, a storage unit 212, a wireless communication unit 213, and the image capture unit 214. Further, the information processing apparatus 210 is connected to the display apparatus 215.

The control unit 211 is, for example, a microprocessor, and executes various kinds of information processing in accordance with a program stored in the storage unit 212. A specific example of the processing executed by the control unit 211 in this embodiment is described later.

The storage unit 212 includes a memory device such as a RAM or a ROM, and stores the program executed by the control unit 211 and various kinds of data. Further, the storage unit 212 operates as a working memory for the control unit 211.

The wireless communication unit 213 is a wireless communication interface, and transmits/receives information to/from the operation device 220 through wireless communication without using a transmission line. The wireless communication unit 213 may be a wireless communication interface based on, for example, the Bluetooth (registered trademark) standard. In this embodiment, the wireless communication unit 213 is capable of executing the transmission/reception of data to/from the plurality of operation devices 220. Specifically, the wireless communication unit 213 establishes a communication connection to each of the operation devices 220, and performs communication with each of the operation devices 220 through time division multiplex communication, through a scheme in which communication is performed using different frequency bands, or through such other scheme. Note that, in a case where a plurality of operation devices 220 are connected to the information processing apparatus 210 at the same time, the information processing apparatus 210 assigns, to each of the operation devices 220, a logical number for identifying the operation device 220. The information processing apparatus 210 identifies the operation device 220 by using the logical number, and exchanges data therebetween.

The image capture unit 214 is a camera device, and captures the image of its surrounding. Specifically, for example, the image capture unit 214 is placed at a position at which the image capture unit 214 is able to capture the image of the user viewing a screen of the display apparatus 215, such as on the top of the display apparatus 215, and captures a color image. In this embodiment, the image capture unit 214 functions as detection means for detecting light emitted from the light emitting portion of the operation device 220. Specifically, by causing the image capture unit 214 to capture the image of the operation device 220 held by the user, the information processing apparatus 210 detects the light emitted from the light emitting portion of the operation device 220.

The display apparatus 215 is, for example, a consumer television set, and displays, on the screen, various kinds of information to be presented to the user, in accordance with a video signal output from the information processing apparatus 210.

Figure 27A:
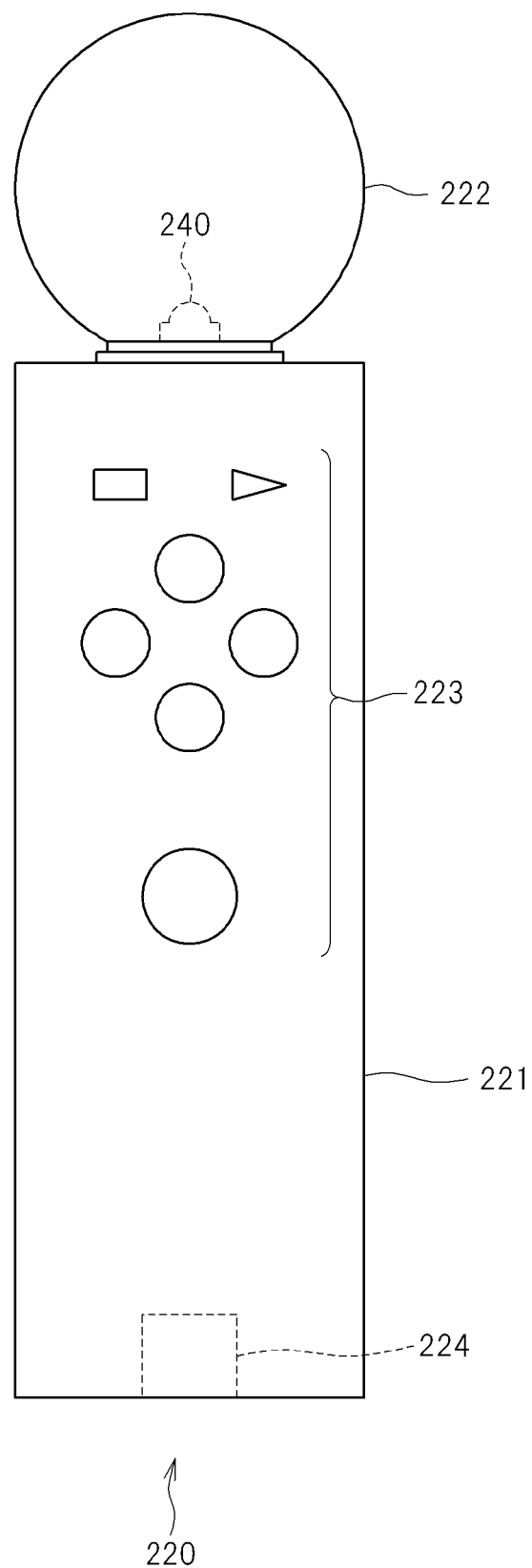
FIG. 27A A front view of an operation device.
Figure 27B:
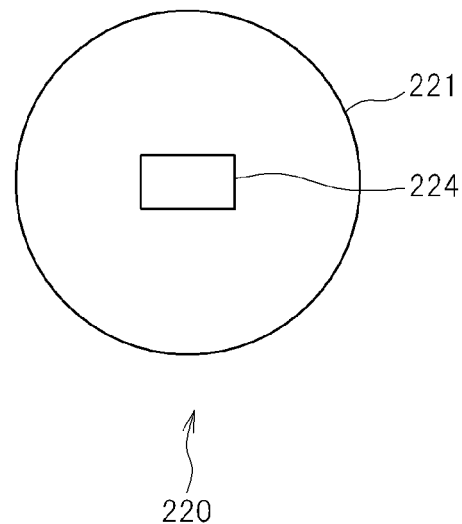
FIG. 27B A bottom view of the operation device.

FIG. 27A and FIG. 27B are diagrams illustrating an example of the outer appearance of the operation device 220. FIG. 27A is a front view of the operation device 220 whereas FIG. 27B is a bottom view thereof. As illustrated in those figures, the operation device 220 has a shape in which a light emitting portion 222 in a spherical shape is engaged to one end of a main body portion 221 in a cylindrical shape, and a plurality of buttons 223 are provided to the front of the main body portion 221. The user holds the main body portion 221 to perform the operation input of depressing the buttons 223 with his/her fingers. Further, as illustrated in FIG. 27A and FIG. 27B, the bottom of the main body portion 221 is provided with a USB connector 224 compliant with the universal serial bus (USB) standard. Note that, instead of the USB connector 224, the operation device 220 may be provided with an extension connector to which various kinds of devices are connectable.

Figure 28:
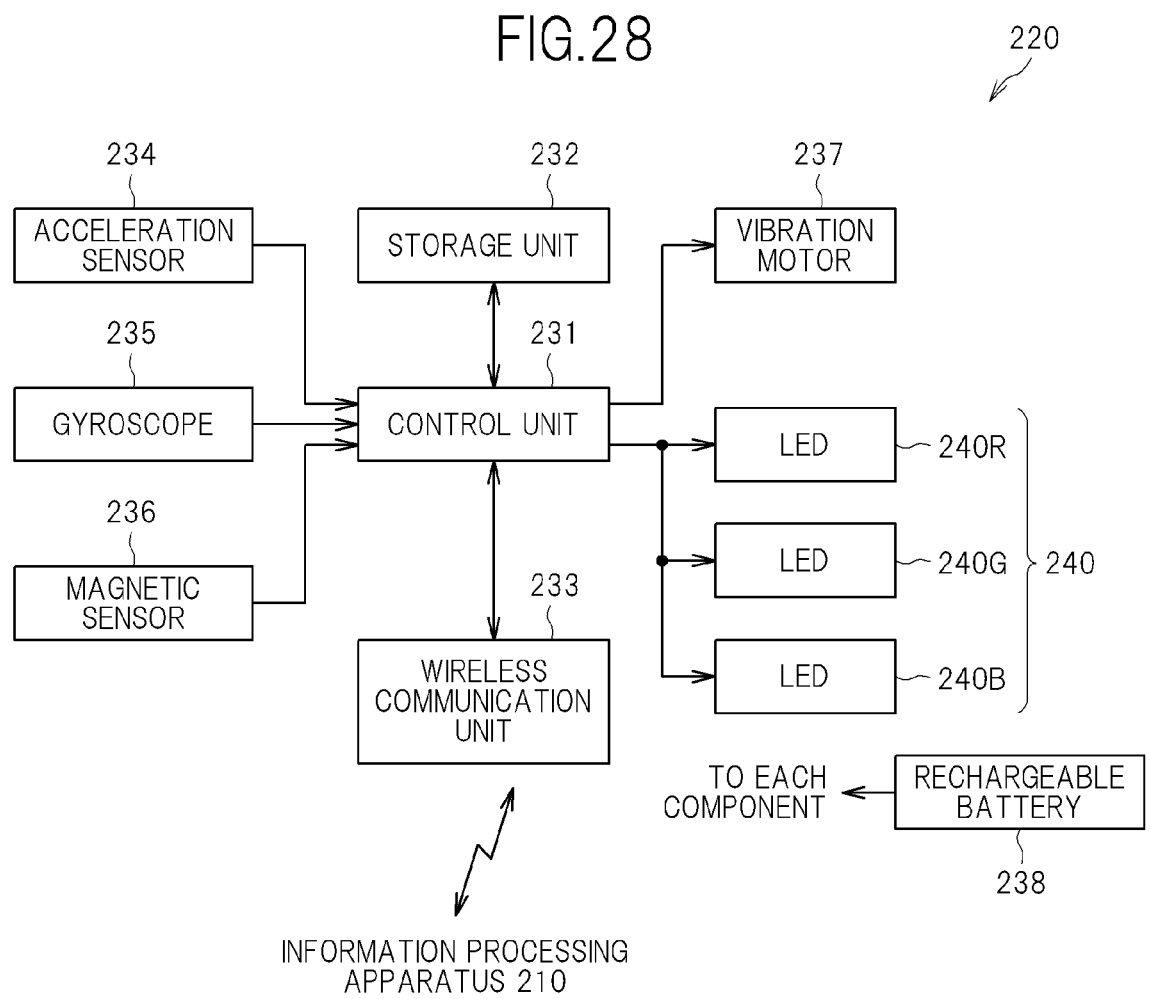
FIG. 28 A configuration block diagram illustrating an internal configuration example of the operation device.

FIG. 28 is a configuration block diagram illustrating an internal configuration example of the operation device 220. As illustrated in the figure, the main body portion 221 includes therein a control unit 231, a storage unit 232, a wireless communication unit 233, an acceleration sensor 234, a gyroscope 235, a magnetic sensor 236, a vibration motor 237, and a rechargeable battery 238. Further, the light emitting portion 222 has a plurality of LEDs 240 built therein.

The control unit 231, which is a microprocessor or the like, acquires a signal indicating the content of operation input performed by the user with respect to the buttons 223, a signal indicating a detection result of each sensor described below, and the like, and then outputs the acquired signals to the wireless communication unit 233. In addition, in accordance with control signals periodically arriving from the information processing apparatus 210 via the wireless communication unit 233, the control unit 231 performs light emission control on the LEDs 240 and drive control on the vibration motor 237.

The storage unit 232 includes a memory device such as a RAM or a ROM, and stores a program and data necessary for the control unit 231 to perform control processing. Further, the wireless communication unit 233 is a wireless communication interface compliant with the same standard as the wireless communication unit 213 of the information processing apparatus 210, and transmits/receives information to/from the wireless communication unit 213 through wireless communication. Specifically, in response to an inquiry from the information processing apparatus 210, the wireless communication unit 233 transmits/receives data to/from the information processing apparatus 210 periodically (for example, every 11.25 ms).

The acceleration sensor 234, the gyroscope 235, and the magnetic sensor 236 each function as detection means for detecting the orientation (posture), the movement, etc. of the operation device 220. Specifically, in this embodiment, it is assumed that three reference axes, which are orthogonal to one another, are set in the operation device 220. The acceleration sensor 234 detects accelerations occurring in the respective directions of the three reference axes. Owing to the acceleration sensor 234 detecting the direction of the gravitational acceleration occurring in the operation device 220, it is possible to identify the tilt of the operation device 220 relative to the vertical direction. Further, based on an acceleration occurring from the movement of the operation device 220, it is possible to identify, when the operation device 220 is moved, the moving direction and the moving speed thereof.

The gyroscope 235 detects the angular speed of rotation performed about each of the three reference axes which are the same as those for the acceleration sensor 234. The gyroscope 235 integrates the speeds detected per unit time, to thereby calculate the rotation amount of the operation device 220 about each of the reference axes. The magnetic sensor 236 detects the magnitude of the magnetic field along each direction of the three reference axes. Owing to the magnetic sensor 236 detecting the Earth's magnetic field, it is possible to identify what direction the operation device 220 is facing.

The vibration motor 237 is driven in response to the control signal from the control unit 231, to thereby cause the operation device 220 to vibrate. This enables the vibration to be delivered to the user's hand holding the operation device 220, resulting in an enhanced realism in a game or the like. Note that, a plurality of vibration motors 237 may be disposed inside the operation device 220.

The rechargeable battery 238, which is a secondary battery such as a lithium-ion battery, stores power supplied from an outside, and supplies the stored power to the respective components of the operation device 220. Specifically, each of the components of the operation device 220 operates by using the power supplied from the rechargeable battery 238. If the remaining amount of the power charged in the rechargeable battery 238 becomes small, it becomes impossible to secure power sufficient for operating, for example, the wireless communication unit 233, which thus may lead to a case where communication to the information processing apparatus 210 via the wireless communication unit 233 cannot be continued.

Specifically, when the operation device 220 is connected to an external USB host device via the USB connector 224, the rechargeable battery 238 is charged with the power supplied via a USB bus from the USB host device. Note that, the USB host device may be the information processing apparatus 210 provided with a USB interface. Further, in this description, the operation device 220 is charged via the USB bus, but the present invention is not limited thereto. The rechargeable battery 238 may be charged through such power supply as consumer AC power supply.

The plurality of LEDs 240 each emit light through control by the control unit 231. In this embodiment, three LEDs 240, that is, an LED 240R for emitting red light, an LED 240G for emitting green light, and an LED 240B for emitting blue light, are disposed in line inside the light emitting portion 222, and each of the LEDs 240 emits light with a light intensity corresponding to the control signal from the control unit 231. Specifically, for example, each of the LEDs 240 is changeable in lightness with the 16-bit gradation, and the LED 240R, the LED 240G, and the LED 240B each emit light with lightness corresponding to a lightness value designated by the control unit 231. Depending on the ratio among the lightnesses of the three colors, the light emitting portion 222 emits light with a variety of colors.

Figures 29, 30, 31:
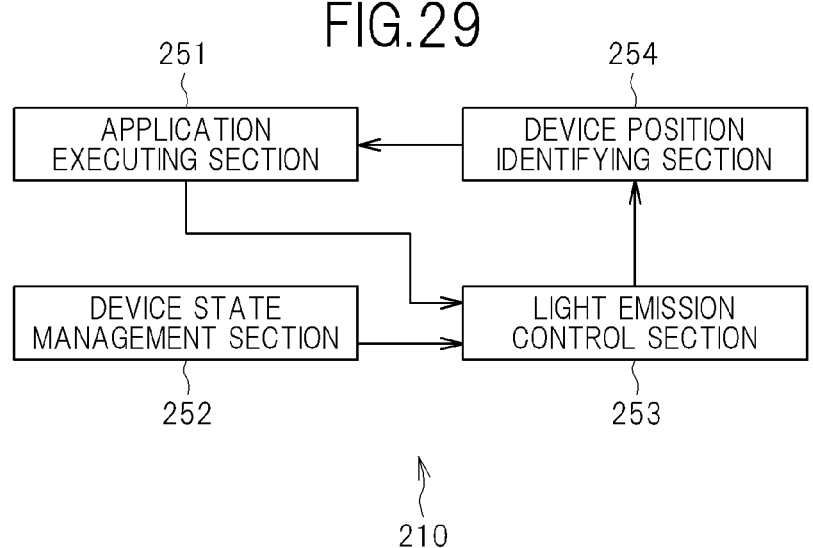
FIG. 29 A functional block diagram illustrating a function example of the information processing apparatus.
FIG. 30 A diagram illustrating an example of a light emission color management table.
FIG. 31 A diagram illustrating an example of a device light emission color correspondence table.

Hereinbelow, description is given of functions implemented by the information processing system 201 having the hardware configuration described above. In this embodiment, as illustrated in FIG. 29, the information processing apparatus 210 functionally includes an application executing section 251, a device state management section 252, a light emission control section 253, and a device position identifying section 254. Those functions are implemented by the control unit 211 executing the program stored in the storage unit 212. The program may be provided by being stored in various kinds of computer-readable information storage media, such as an optical disc, or may be provided via a communication network such as the Internet.

The application executing section 251 executes various kinds of processing defined by an application program, such as a game application. Specifically, the application executing section 251 executes various kinds of processing in response to instruction operation input from the operation device 220 by the user, and outputs results of the execution through such a method as performing display on the screen of the display apparatus 215.

Here, the application executing section 251 may execute processing not only in accordance with operations performed by the user on the buttons 223 provided to the operation device 220 but also in accordance with the position and the orientation of the operation device 220 in the real space. For that purpose, the application executing section 251 acquires information indicating the position and the orientation of the operation device 220 from the device position identifying section 254 described below. By doing so, the application executing section 251 can execute processing in response to various kinds of actions of the user, such as moving the position of the operation device 220, swinging the operation device 220, and rotating the operation device 220. Further, in response to a content of the processing, the application executing section 251 may output a vibration instruction for causing the vibration motor 237 built in the operation device 220 to vibrate. The vibration instruction is transmitted to the operation device 220 via the wireless communication unit 213, and causes the vibration motor 237 inside the operation device 220 to vibrate.

The device state management section 252 manages the state of the operation device 220 connected to the information processing apparatus 210. Specifically, if a connection request has been received from the operation device 220 via the wireless communication unit 213, the device state management section 252 assigns the logical number (port number) to the operation device 220 which has made the connection request. Here, the information processing apparatus 210 assigns different logical numbers to the respective operation devices 220 in order of the connection requests. Specifically, the information processing apparatus 210 associates information for identifying, on a wireless communication network, the operation device 220 which has made the connection request (for example, network address) with an unassigned port number. With the execution of the assignment of port numbers (port assignment), the information processing apparatus 210 can afterwards identify each of a plurality of operation devices 220 connected thereto at the same time by means of the port numbers. For example, the application executing section 251 uses the port numbers to identify which operation device 220 has been used among the plurality of operation devices 220 to perform the operation input, and to which operation device 220 each of the control signals is to be transmitted.

Further, the device state management section 252 acquires information on the state of each of the connected operation devices 220, and, in accordance with the acquired information, executes processing of, for example, presenting the state of the operation device 220 to the user. A specific example of the processing is described later.

The light emission control section 253 controls the light emission of the light emitting portion 222 of each of the connected operation devices 220 by using an instruction from the application executing section 251 and information on the device state of the operation device 220 acquired by the device state management section 252. Specifically, when a plurality of operation devices 220 are communicably connected via the wireless communication unit 213, the light emission control section 253 controls the light emission color so that the light emitting portions 222 of the plurality of operation devices 220 emit light beams having different colors from one another. Further, in accordance with the device state of the communicably-connected operation device 220, the light emission mode of the light emitting portion 222 is changed. Further, the light emission control section 253 may change the light emission color of the light emitting portion 222 in accordance with various kinds of conditions, such as the execution state of processing performed by the application executing section 251. A specific example of the light emission control performed on the light emitting portion 222 by the light emission control section 253 is described later.

The device position identifying section 254 identifies the position of each of the operation devices 220 by using the image captured by the image capture unit 214. Specifically, the device position identifying section 254 acquires data of the captured image obtained by the image capture unit 214 at predetermined time intervals. Then, image processing such as pattern matching processing is executed with respect to the acquired captured image, and, from the captured image, the image of light emitted from the light emitting portion 222 is extracted. Further, based on the position of the extracted light image in the captured image, the device position identifying section 254 identifies the position of the operation device 220 in the field of view of the image capture unit 214. Further, based on the size of the extracted light image in the captured image, a distance from the image capture unit 214 to the operation device 220 is identified. With this, the position of the operation device 220 in the real space with respect to the image capture unit 214 is identified.

However, depending on how the user operates the operation device 220, there occurs a case where the light emitting portion 222 becomes temporarily unable to be detected, for example, because the operation device 220 has moved out of the field of view of the image capture unit 214, because the light emitting portion 222 has been turned toward the opposite side of the image capture unit 214, or because the light from the light emitting portion 222 has been blocked by an obstacle, the user's hand, or the like. In view of this, in this embodiment, the device position identifying section 254 identifies the position of the operation device 220 by using not only the captured image from the image capture unit 214 but also a signal indicating the detection results of the sensors transmitted from each of the operation devices 220. With this, it is possible to identify the position of the operation device 220 with more accuracy, and also to identify the tilt of the operation device 220. In addition, it is possible to track the position of the operation device 220 even when the image of the light of the light emitting portion 222 cannot be detected from the captured image.

Specifically, the device position identifying section 254 starts with a predetermined reference position and periodically repeats position identification processing for the operation device 220 by using the light of the light emitting portion 222, to thereby track the position of the operation device 220. In parallel with that, by using output values of the various kinds of sensors built in the operation device 220, the device position identifying section 254 also calculates the moving direction and the moving distance of the operation device 220 with respect to the reference position, to thereby track the position of the operation device 220. On this occasion, in order to calculate the moving direction and the moving distance of the operation device 220 from the output values of the sensors, the device position identifying section 254 performs arithmetic computations on the output values of the sensors by using predetermined coefficients. Then, the device position identifying section 254 corrects the predetermined coefficients so as to minimize a difference between the position of the operation device 220 identified using the light of the light emitting portion 222 and the position identified using the output values of the sensors. When the light from the light emitting portion 222 has failed to be detected, the arithmetic computations are performed on the output values of the sensors by using the corrected coefficients, and then, the position of the operation device 220 is identified. In this manner, by performing correction using information on the position of the operation device 220 acquired while the light can be detected from the light emitting portion 222, even when the light cannot be detected, it is possible to continue to identify the position of the operation device 220 relatively accurately based on the output values of the sensors.

Note that, as detailed description is given later, in the case where a plurality of operation devices 220 are connected to the information processing apparatus 210, the colors of the light emission of the respective operation devices 220 are controlled to be different from one another by the light emission control section 253. Accordingly, when there exist a plurality of light images of the light emitting portions 222 in the captured image obtained by the image capture unit 214, based on the color of the light, it is possible to identify to which operation device 220 the light image detected from the captured image correspond.

Hereinbelow, description is given of a specific example of a method in which the light emission control section 253 controls the light emission color of each of the operation devices 220. In this embodiment, the storage unit 232 of the operation device 220 stores a color management table. The color management table is a table associating a color number with information on the lightness of each LED 240, which is used for causing the light emitting portion 222 to emit light with a color corresponding to the color number. FIG. 30 illustrates an example of the color management table. In the example of the figure, each of a total of sixteen color numbers (from 0 to 15) is associated with lightness values Rn, Gn, and Bn (n=0, 1, ..., 15) representing respective lightnesses of the LEDs 240R, 240G, and 240B for causing the light emitting portion 222 to emit light with a predetermined color. Here, each of the lightness values Rn, Gn, and Bn is a numerical value having, for example, a 16-bit length.

When the light emission control section 253 of the information processing apparatus 210 changes the light emission color of the light emitting portion 222 in accordance with various kinds of conditions described below, the light emission control section 253 transmits, to the operation device 220, an instruction to change the light emission color along with information designating the color number. As described above, the information processing apparatus 210 transmits/receives data to/from the operation device 220 through the wireless communication at predetermined time intervals, and hence, at a timing corresponding to this predetermined time interval, the light emission control section 253 can transmit the instruction to change the light emission color of the operation device 220. After reception of the change instruction, the control unit 231 of the operation device 220 reads, from the color management table, the lightness value of each LED 240 associated with the designated color number. Then, in accordance with the read lightness value, the control unit 231 controls the lightness of each LED 240, to thereby cause the light emitting portion 222 to emit light with a color corresponding to the designated color number. With this, the light emission control section 253 can cause the light emitting portion 222 of the operation device 220 to emit light with any one of sixteen patterns of colors, such as blue, red, magenta, green, etc., associated in advance with the color numbers 0 to 15.

Note that, the operation device 220 may store a plurality of color management tables. For example, in the ROM, there may be stored a fixed color management table T1 written at the time of factory shipment of the operation device 220, and, in the RAM, there may be stored a variable color management table T2 which is rewritable in accordance with a selection made by the user or an instruction from the application executing section 251 while the operation device 220 is in operation. In this case, when the operation device 220 is in the initial state, the variable color management table T2 is loaded into the RAM with the same contents as those of the fixed color management table T1. Then, for example, in accordance with the instruction operation performed by the user, the light emission control section 253 selects a new color which is not contained in the fixed color management table T1, and then transmits, to the operation device 220, information on the lightness value of each LED for causing the light emitting portion 222 to emit light with that color, while designating the color number. In accordance with the information transmitted from the information processing apparatus 210, the control unit 231 of the operation device 220 updates the lightness values associated with the designated color number in the variable color management table T2. With this, the light emission control section 253 can designate, as the light emission color of the operation device 220, even a color which does not exist in the fixed color management table T1 stored in the ROM.

Alternatively, the light emission control section 253 may transmit, to the operation device 220, an instruction to update the variable color management table T2 in the RAM, in accordance with a request from the application executing section 251. With this, regardless of the colors stored in the fixed color management table T1, the information processing apparatus 210 can cause the operation device 220 to prestore information on a color with which the application executing section 251 desires to cause the operation device 220 to emit light along with the execution of the processing, and thus can realize such light emission control that responds to the content of the processing of the application executing section 251, such as changing the light emission color in synchronization with the progress of the processing of the application executing section 251.

In the case where a plurality of color management tables are stored in the operation device 220 as described above, at the time of changing the light emission color of the operation device 220, the light emission control section 253 transmits, to the operation device 220, the instruction to change the light emission color along with information for identifying the color management table (here, information designating one of the fixed color management table T1 and the variable color management table T2) and information designating the color number in the identified color management table.

Further, the light emission control section 253 may give the instruction to change the light emission color by directly designating the lightness value of each LED 240, instead of designating the color number. For example, in accordance with the instruction from the application executing section 251, the light emission control section 253 transmits, to the operation device 220, the instruction to change the light emission color along with information on the lightness value representing the lightness of each of the LED 240R, 240G, and 240B. With this, in accordance with, for example, the content of the processing executed by the application executing section 251, the information processing apparatus 210 can cause the light emitting portion 222 of the operation device 220 to emit light with a color which is not contained in the color management table of the operation device 220.

Next, description is given of some specific examples of the light emission control performed on the light emitting portion 222 by the light emission control section 253 in accordance with various kinds of conditions. Note that, as for a plurality of examples of the conditions for the light emission control described below, some may be used in combination.

First, as a first example, description is given of control in which, in the case where a plurality of operation devices 220 are communicably connected, the light emitting portions 222 are caused to emit light so that the colors of light emission of the respective operation devices 220 are different from one another.

In this embodiment, it is assumed that when the user desires to start using the operation device 220, the user operates a predetermined button 223 (for example, power button). In response to the operation, the operation device 220 starts control to cause the light emitting portion 222 to emit light in a predetermined pattern. Specifically, the operation device 220 reads the lightness values of a predetermined color number from the fixed color management table T1 in the ROM, and then causes the respective LEDs to emit light based on the read lightness values. With this, until a wireless communication connection to the information processing apparatus 210 is established, the light emitting portion 222 emits light with a particular color. Therefore, the user can know that a wireless communication connection has not been established yet from the light emission color of the light emitting portion 222. Further, the operation device 220 may cause the light emitting portion 222 to flash with a predetermined color, or may cause the light emitting portion 222 to emit light while changing the color among a plurality of colors (for example, seven colors) in order. With this, it is possible to show the user more clearly that a connection is being established.

On the other hand, in response to the instruction to start using the operation device 220 from the user, the operation device 220 transmits the connection request to the information processing apparatus 210. In response thereto, the device state management section 252 assigns the port number to the operation device 220 as described above. Then, the light emission control section 253 which has received, from the device state management section 252, a notification indicating that the port number has been assigned to a new operation device 220 determines the light emission color of the newly-connected operation device 220. For example, the light emission control section 253 determines, as the light emission color of the operation device 220, a color associated with the color number having the same number as the assigned port number (Specifically, in the case of the operation device 220 which has been assigned to a first port, the color number is 1.). Then, an instruction to change to the light emission color designated by the determined color number is given to the operation device 220. In accordance with the change instruction, the light emission color of the operation device 220 is changed, and the user can know that a wireless communication connection has been established. Note that, the changing of the color may be executed in a seamless manner. Specifically, the light emission color of the light emitting portion 222 may be changed by gradually changing the lightness value of each LED 240 from the light emission color at a timing when a wireless communication connection has been established to the designated color.

Here, it is assumed that the light emission control section 253 determines, as the colors of light emission, different colors among the port numbers assigned to the respective operation devices 220. For example, the light emission control section 253 assigns in advance different colors among the port numbers: blue (color number 1) for the operation device 220 assigned to the first port; red for a second port (color number 2); magenta for a third port (color number 3); and green for a fourth port (color number 4). With this, in the case where a plurality of operation devices 220 are connected to the information processing apparatus 210 at the same time, the light emitting portions 222 of the plurality of operation devices 220 emit light with different colors from one another, which thus enables the user to identify each of the operation devices 220 based on the light emission color. Owing to this, the operation device 220 does not need to be provided with an indicator or the like for displaying the port number to which the operation device 220 is connected.

Further, the light emission control section 253 may change the color determined based on the port number, in accordance with an instruction from the user. In this case, for example, the user operates the operation device 220 to give an instruction to change the light emission color on a menu screen. In response thereto, the light emission control section 253 presents candidates for the light emission color on the screen of the display apparatus 215. On this occasion, the presented candidates for the light emission color may be, for example, the colors stored in the variable color management table T2 stored in the operation device 220 held by the user who has given the instruction.

Further, the light emission control section 253 may exclude, from the colors to be presented, the color already selected as the light emission color of another operation device 220. Specifically, in this embodiment, it is assumed that the information processing apparatus 210 stores the colors which have been specified for the respective communicably-connected operation devices 220 for the light emission. FIG. 31 illustrates an example of a device light emission color correspondence table for managing correspondence relation between the port number of the operation device 220 and the light emission color of the operation device 220. As described above, when a communication connection is established, the operation device 220 is first instructed to emit light with a color determined in advance for each port number. The light emission control section 253 stores the specified color in association with the port number in the device light emission color correspondence table. In the example of FIG. 31, it is assumed that the operation device 220 connected to the first port is instructed to emit light with blue, and the operation device 220 connected to the second port is instructed to emit light with red.

Figure 32:
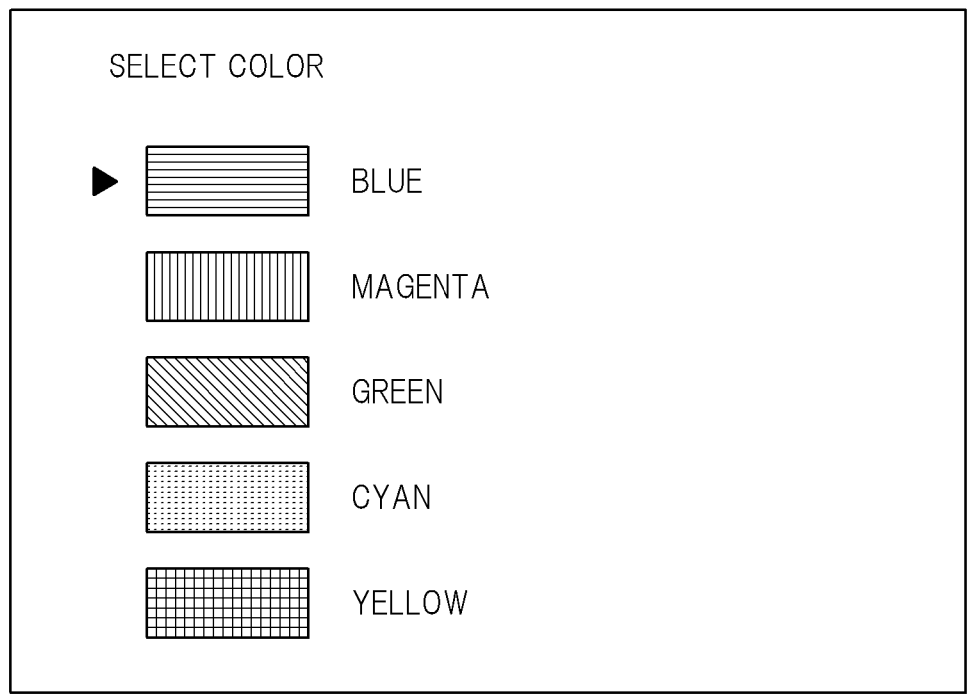
FIG. 32 A diagram illustrating an example of a presentation screen of selection candidates for a light emission color.

In this state, when the user holding the operation device 220 connected to the first port has given the instruction to change the light emission color, the light emission control section 253 acquires information on the colors stored in the variable color management table T2 in the operation device 220. Then, it is checked whether or not there is a color specified as the light emission color of another operation device 220 in the acquired colors, and remaining colors obtained after excluding such a color are presented to the user as selection candidates for the light emission color. In this case, red already specified for the operation device 220 using the second port is excluded. FIG. 32 illustrates an example of a presentation screen for such selection candidates for the light emission color. When the user has selected an arbitrary color from among the presented candidates for the light emission color, the light emission control section 253 designates the color number of the selected color, and gives the instruction to change the light emission color to the operation device 220. With this configuration, regardless of the port number assigned to the operation device 220 held by the user himself/herself, the user can change the light emission color of the light emitting portion 222 to his/her favorite color. On the other hand, the light emission color of another operation device 220 is not presented as the selection candidate, and hence, even if the users freely change the colors of light emission of their operation devices 220, it is possible to perform control in such a manner that the colors of light emission of the operation devices 220 connected through the wireless communication become different colors from one another. Therefore, at the time of identifying the positions of the operation devices 220 based on the light beams from the light emitting portions 222 of the plurality of operation devices 220, the device position identifying section 254 can execute the position identification processing by distinguishing the plurality of operation devices 220 from one another.

Note that, the presentation of the selection candidates for the light emission color may be realized by a method other than displaying on the screen of the display apparatus 215. For example, the light emission control section 253 may switch among the plurality of selection candidates for the light emission color in order every time the user operates the button 223 for giving an instruction for color changing, when causing the light emitting portion 222 to emit light. With this, the user can change the light emission color by repeatedly operating the button 223 until the light emitting portion 222 emits light with a color which the user himself/herself desires. In this case, too, if the light emission control section 253 skips the light emission color of another operation device 220 when performing the switching of the light emission color, the light emission control section 253 can exclude the color already used for another operation device 220 from the selection candidates for the light emission color which are to be presented to the user. Note that, in addition to the same color as the color already used for the other operation device 220, the light emission control section 253 may exclude a color similar to the already-used color (for example, a color having a hue value difference within a predetermined threshold) from the selection candidates to be presented to the user.

Further, while the operation device 220 is in use, the user may make a request to change the port number assigned to the operation device 220. In this case, if the light emitting portion 222 of the operation device 220 is emitting light with a color associated in advance with the port number before the change, the light emission control section 253 may change the light emission color of the light emitting portion 222 to the color associated with the port number after the change. In another case, when the light emission color has already been changed in accordance with a selection instruction from the user before the port number is changed, the light emission control section 253 may allow the light emission color selected by the user to be maintained instead of changing the light emission color of the operation device 220. In this case, in the device light emission color correspondence table illustrated as an example in FIG. 31, only the light emission color associated with the port number assigned so far to the operation device 220 and the light emission color associated with the newly-assigned port number are changed.

Further, when the communication connection to the information processing apparatus 210 has been cut off due to a network trouble or the like while the operation device 220 is in use, the control unit 231 of the operation device 220 may execute control so as to cause the light emission color of the light emitting portion 222 to be changed to a predetermined color indicating the state in which the communication connection is not established. If the predetermined color used in this case is a color different from the light emission color determined based on the port number, the user can know the cut-off of the communication connection by means of the light emission of the light emitting portion 222.

Further, in an opposite manner to the above-mentioned control in which the light emitting portion 222 of the operation device 220 is caused to emit light with a color associated with the assigned port number, the information processing apparatus 210 may assign, to the operation device 220, the port number associated with the light emission color requested by the operation device 220 side. To give a specific example, when the connection request designating the light emission color has been received from the operation device 220, the device state management section 252 assigns the port number associated in advance with the designated light emission color to the operation device 220 which has made the connection request. In this case, the operation device 220 is provided on the surface thereof with, for example, a selection switch for selecting a color, and the user operates the selection switch to designate the selected color and makes the connection request to the information processing apparatus 210. Alternatively, the operation device 220 may make the connection request by designating the light emission color used when the operation device 220 was operated last time. Further, the operation device 220 may be configured to be connectable, via the USB connector 224, another extension connector, or the like, to an extension device (for example, memory card) storing information for identifying the light emission color (for example, color number), and may make the connection request by designating the color identified by the information stored in the extension device. With this, instead of changing later the color determined based on the port number assigned at the time of establishing the connection, the user can cause the light emitting portion 222 of his/her own operation device 220 to emit light with his/her favorite color or a color which the user always uses from the beginning of the establishment of the connection. Note that, in this example, too, the designated color is notified to the light emission control section 253, and the light emission control section 253 manages the colors of light emission of the connected operation devices 220. With this, in a case where the color designated by the operation device 220 which has made a new connection request is already assigned as the light emission color of another operation device 220, the information processing apparatus 210 executes such control as to reject the connection request from the operation device 220 or display an error message to cause the user to select another color through a method similar to the above-mentioned example of FIG. 32. Therefore, it is possible to cause the plurality of operation devices 220 to emit light with different colors from one another.

Next, as a second example of the light emission control performed by the light emission control section 253, description is given of an example of control in which the light emission mode of the light emitting portion 222 is changed in accordance with the device state of the connected operation device 220.

In this example, the light emission control section 253 uses the information on the device state of the operation device 220 which is acquired by the device state management section 252 to perform the light emission control on the light emitting portion 222. Specifically, for example, the light emission control section 253 may change the light emission mode of the light emitting portion 222 in accordance with the charge state of the rechargeable battery 238 built in the operation device 220. In this case, the device state management section 252 periodically acquires numerical information indicating the remaining charge of the rechargeable battery 238 from the operation device 220. Then, when the numerical information has fallen below a predetermined threshold, and it is determined that the remaining charge of the rechargeable battery 238 has become small, the device state management section 252 notifies the light emission control section 253 of a result of the determination. In response thereto, the light emission control section 253 gives an instruction to the operation device 220 so that the light emitting portion 222 is caused to emit light with a predetermined color indicating that the remaining charge has become small. With this, even if the operation device 220 does not have an indicator or the like for indicating the charge state of the rechargeable battery 238, the user can know the charge state of the operation device 220.

Further, when the remaining charge of the operation device 220 has become small, the light emission control section 253 may execute control so as to cause flashing display in which switching is alternately made between the light emission color specified based on the assigned port number or in accordance with the selection made by the user as described above, and the light emission color used for giving a warning about the remaining charge.

Further, instead of performing the light emission control which constantly gives a warning about the state when the remaining charge has become small, the light emission control section 253 may cause, at a predetermined timing, the light emitting portion 222 to emit light with the light emission color indicating the remaining charge. For example, when the user has executed an operation on a predetermined button 223 for displaying the remaining charge, the light emission control section 253 causes the light emitting portion 222 to emit light with a color corresponding to the remaining charge of that time point (green in a state close to full-charge, yellow when half-charged or less, and red in a state close to empty). Further, when the user has given an instruction to display the remaining charge, the light emission control section 253 may change the light emission mode without changing the light emission color, such as: a steady light in the state of full-charge; a flashing light when half-charged or less; and no light in the state close to empty. With this, while usually allowing the light emitting portion 222 to emit light with a color selected based on the connected port number or by himself/herself, the user can check the charge state by changing the light emission mode of the light emitting portion 222 if necessary. Further, without changing the hue of the light emission color, the light emission control section 253 may present the charge state to the user by changing the lightness of the light emission color depending on the remaining charge.

Note that, depending on circumstances, independently of the control by the light emission control section 253, the operation device 220 may change the light emission mode of the light emitting portion 222 in accordance with the charge state by using the above-mentioned method. As described above, if the remaining charge becomes small, an instruction may not be received from the light emission control section 253 because the wireless communication connection via the wireless communication unit 233 cannot be maintained. In this case, too, if the operation device 220 independently changes the light emission mode of the light emitting portion 222 in accordance with the remaining charge, the user can know the remaining charge. Further, even when the establishment of a wireless communication connection to the information processing apparatus 210 is being executed, it is possible to control the light emission mode in accordance with the remaining charge.

Further, the light emission control section 253 may execute the light emission control on the operation device 220 in accordance with various kinds of device states of the operation device 220 other than the charge state. For example, the operation device 220 may detect the mode of vibration generated by driving the vibration motor 237 based on the outputs of the sensors such as the acceleration sensor 234, and the light emission control section 253 may change the light emission color of the light emitting portion 222 in accordance with the mode of the vibration. To give a specific example, even when the same vibration motor 237 is driven, the mode of the vibration varies depending on the state of the operation device 220. Examples of the state of the operation device 220 include: a case where the operation device 220 is placed on a table or the like; a case where the user is gently holding the main body portion 221 with his/her hand; and a case where the user is firmly holding the main body portion 221 with his/her hand. By utilizing this fact, for example, the light emission control section 253 can execute such control that causes the light emission color to be changed to a predetermined color when the user firmly holds the main body portion 221 with his/her hand while the vibration motor 237 is being driven. Further, the light emission control section 253 may change the light emission color in accordance with the content of an operation performed by the user with respect to the buttons 223. Further, apart from the sensors described above, the operation device 220 may be provided with a pressure-sensitive sensor or the like for detecting, for example, whether or not the user is holding the main body portion 221, and the light emission control section 253 may change the light emission color in accordance with a result of the detection by such a sensor.

With this configuration, the light emission control section 253 can change the light emission mode of the light emitting portion 222 in accordance with various kinds of conditions including whether or not the user is holding the operation device 220, and what kind of button operation the user is performing. Depending on the content of the processing executed by the application executing section 251, such control may be performed that the light emission color of the light emitting portion 222 is changed to a particular color while a particular button 223 is depressed. As a result, it is possible to present an operation timing or the like to the user in an easy-to-recognize manner. For example, in a case where various kinds of operation inputs are performed by swinging or tilting the operation device 220 while a particular button 223 is depressed, if the light emission color of the light emitting portion 222 is changed in response to the depression of the particular button 223, it is possible to show in an easy-to-recognize manner what kind of button operation the user holding the operation device 220 is performing, to another user than the user holding the operation device 220 to operate the buttons 223.

Further, the light emission control section 253 may change the light emission color in accordance with an extension device or the like connected to the operation device 220. For example, the operation device 220 may be connectable, via the USB connector 224, another extension connector, or the like, to an extension device (for example, memory card) storing identification information for identifying the user. In this case, the identification information of the user stored in the extension device is transmitted from the operation device 220 to the information processing apparatus 210, and the light emission control section 253 gives an instruction to cause the light emitting portion 222 to emit light with a color stored in advance in association with the transmitted identification information of the user. With this, even in a case where the user uses an arbitrary one of a plurality of operation devices 220, by connecting the extension device having his/her own identification information written therein to the operation device 220 to be used, the user can always cause the operation device 220 to emit light with a color preset in accordance with his/her preference.

As another example of the light emission control performed by the light emission control section 253, such control may be executed that the light emission color of the light emitting portion 222 is changed to a color specified by the application executing section 251 at a timing at which the application executing section 251 gives the specification. In the description above, a plurality of users hold the respective operation devices 220 to perform the operation input, but, as a specific example, description is herein given of an example in which a plurality of users share a single operation device 220. Further, in this example, the application executing section 251 executes a multi-user game application in which the plurality of users perform the instruction operation in turn to advance the game. In this case, the users take turns holding the operation device 220 to perform the instruction operation. On this occasion, every time the application executing section 251 advances the game processing after each user finishes the instruction operation, the light emission control section 253 performs control so as to cause the light emitting portion 222 to emit light with a color associated with the next user. In order to realize such control, each user selects a color to be associated with himself/herself from among a plurality of selection candidates before the game is started. Specifically, for example, the light emission control section 253 presents, to each user, in turn, the selection screen for the light emission color as illustrated in FIG. 32, and allows each user to select the light emission color in advance. For example, assuming that two persons, that is, a player 1 and a player 2, participate in the game, and that the player 1 and the player 2 have selected red and blue beforehand, respectively, when a timing at which the player 1 should perform the instruction operation has come, the light emission control section 253 gives, to the operation device 220, an instruction to cause the light emitting portion 222 to emit light with red in response to an instruction from the application executing section 251. Owing to this, when the light emitting portion 222 emits light with red, the player 1 can know that he/she should operate the operation device 220. After the player 1 finishes the operation, the light emission control section 253 causes the light emitting portion 222 to emit light with blue. This indicates that the player 2 should perform the operation next.

To give still another example of the light emission control performed by the light emission control section 253, such control may be executed that the light emission color of the light emitting portion 222 is changed in accordance with a surrounding environment of the information processing apparatus 210. For example, depending on whether a room where the information processing apparatus 210 is placed is dark or bright, there occurs a difference in detection accuracy of the image capture unit 214 for the light emission color of the light emitting portion 222. Accordingly, in accordance with the surrounding environment of the information processing apparatus 210 identified based on the captured image obtained by the image capture unit 214, the light emission control section 253 changes the light emission luminance of the light emitting portion 222. Specifically, when the lightness of the whole captured image is low (the room is dark), the light emission luminance of the light emitting portion 222 is decreased. With this, it is possible to suppress the power consumption caused by the light emission of the light emitting portion 222 without decreasing the detection accuracy for the light emitting portion 222 in the captured image. Conversely, when the lightness of the whole captured image is high (the room is bright), the light emission luminance of the light emitting portion 222 is increased, thereby increasing the detection accuracy for the light emitting portion 222.

Further, the light emission control section 253 may change the light emission color of the light emitting portion 222 in accordance with the hue of the captured image obtained by the image capture unit 214. For example, the light emission control section 253 analyzes the color distribution of a background color contained in the captured image, such as the color of clothing worn by the user, and, based on a result of the analysis, changes the light emission color of the light emitting portion 222 to such a color that is easy to detect against the background color of the captured image (for example, complementary color). With this, it is possible to improve the detection accuracy for the light emitting portion 222. Here, in the description above, the light emission color of the light emitting portion 222 is changed based on the captured image obtained by the image capture unit 214. However, the present invention is not limited thereto, and the light emission color of the light emitting portion 222 may be adjusted using an external light sensor or the like provided to the information processing apparatus 210 or the operation device 220.

In a case where the light emission mode of the light emitting portion 222 is changed based on various kinds of conditions as described above, the light emission control section 253 notifies the device position identifying section 254 of a fact that an instruction to change the light emission mode has been transmitted to the operation device 220. Owing to this, the device position identifying section 254 changes a detection condition for the light image of the light emitting portion 222 in accordance with the change of the light emission color of the light emitting portion 222, and thus can continue identifying the position of the same operation device 220 even when the light emission color of the light emitting portion 222 has been changed in the captured image. Conversely, while the device position identifying section 254 is executing the position identification processing for the operation device 220 in response to a request from the application executing section 251, the light emission control section 253 may execute control so as to interrupt the light emission of the light emitting portion 222 which possibly prevents the device position identifying section 254 from detecting the light emitted from the light emitting portion 222 (for example, flashing of the light for notifying the user of the charge state).

Note that, the embodiments of the present invention are not limited to those described above. For example, the shapes of the main body portion 221 and the light emitting portion 222 of the operation device 220 or the arrangement of the buttons 223 may be different from those described above.

Further, part of the processing executed by the light emission control section 253 in the description above may be executed on the operation device 220 side. For example, in accordance with its own device state identified by the remaining charge of the rechargeable battery 238, information on the operation performed on the buttons 223, the outputs of the sensors, and the like, the control unit 231 of the operation device 220 changes the light emission color of the light emitting portion 222 by using predetermined conditions. In this case, the operation device 220 notifies the information processing apparatus 210 of the change of the light emission color of the light emitting portion 222, and hence the device position identifying section 254 of the information processing apparatus 210 can continue the position identification processing for the operation device 220 while following the change of the light emission color of the light emitting portion 222.

The invention claimed is:

1. An operation device comprising: a main body having a proximal end and a distal end;
a light emitting member located on the distal end of the main body; and
a connection portion located on the proximal end of the main body to which a plurality of operation modules can be connected,
wherein each of the plurality of operation modules comprises:
a portion to be connected to the connection portion of the operation device;
an additional connection portion which is provided on an opposite side of the portion to be connected, wherein the additional connection portion has the same shape as the connection portion of the main body so that another one of the plurality of operation modules can be connected thereto in series, and
a rotation mechanism on the portion to be connected to the connection portion for changing a direction of an input member.

2. The operation device according to claim 1, wherein each of the plurality of operation modules comprises:
identification information storing means for storing identification information for identifying a type of the operation module, and
wherein the main body comprises identification information acquiring means for acquiring the identification information from the identification information storing means contained in each of the operation modules connected directly or indirectly to the main body.

3. The operation device according to claim 1, wherein the main body comprises:
order discriminating means for discriminating an order of the operation modules connected to the main body in series.

4. The operation device according to claim 3, wherein each of the plurality of operation modules comprises:
a signal line located between the portion to be connected to the connection portion and the additional connection portion; and a voltmeter for measuring a voltage at a predetermined position on the signal line, wherein the main body comprises a power source for applying, from one end side thereof, a predetermined voltage to the signal lines of the operation modules connected in series, and wherein the order discriminating means discriminates the order of the operation modules connected to the main body in series based on the voltage measured by each of the voltmeters.

5. The operation device according to claim 1, wherein at least one of the plurality of operation modules is configured to connect to the main body or another one of the plurality of other operation modules in a plurality of directions.

6. The operation device according to claim 5, further comprising:

determination means for determining the direction of the input member.

7. The operation device according to claim 6, wherein the at least one of the plurality of operation modules comprises a sensor for detecting a posture of the at least one of the plurality of operation modules, wherein the main body comprises a sensor for detecting a posture of the main body, and wherein the determination means determines the direction of the input member provided on the at least one of the plurality of operation modules with respect to the main body, based on a result of the detection by the sensor in the main body and a result of the detection by the sensor in the at least one of the plurality of operation modules.

\* \* \* \* \*